(12) United States Patent
Boudreault et al.

(10) Patent No.: US 8,639,609 B2
(45) Date of Patent: Jan. 28, 2014

(54) CROSS MARGINING OF TRI-PARTY REPO TRANSACTIONS

(75) Inventors: James Boudreault, Palatine, IL (US); Jonathan Kronstein, Elmhurst, IL (US); Frederick Sturm, Chicago, IL (US); Tim Elliott, Evanston, IL (US); Tim Doar, Oak Park, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 13/315,628

(22) Filed: Dec. 9, 2011

(65) Prior Publication Data

US 2012/0150715 A1 Jun. 14, 2012

Related U.S. Application Data

(60) Provisional application No. 61/421,533, filed on Dec. 9, 2010.

(51) Int. Cl.
*G06Q 40/00* (2012.01)
*G06Q 40/04* (2012.01)

(52) U.S. Cl.
CPC .................................. *G06Q 40/04* (2013.01)
USPC .......................................................... 705/37

(58) Field of Classification Search
USPC .................................................... 705/35–45
See application file for complete search history.

(56) References Cited

U.S. PATENT DOCUMENTS

| 5,802,499 | A * | 9/1998 | Sampson et al. ................ 705/35 |
| 6,016,482 | A * | 1/2000 | Molinari et al. ................ 705/35 |
| 7,426,487 | B2 * | 9/2008 | Glinberg et al. ................ 705/35 |
| 7,428,508 | B2 * | 9/2008 | Glinberg et al. ................ 705/37 |
| 7,509,275 | B2 * | 3/2009 | Glinberg et al. ................ 705/35 |
| 7,577,601 | B1 | 8/2009 | Rademacher et al. |
| 7,769,667 | B2 * | 8/2010 | Glinberg et al. ................ 705/37 |
| 7,974,897 | B2 * | 7/2011 | Caffrey et al. .................. 705/35 |
| 2001/0037284 | A1 * | 11/2001 | Finkelstein et al. ............ 705/37 |
| 2003/0023539 | A1 * | 1/2003 | Wilce et al. ..................... 705/37 |
| 2003/0074300 | A1 * | 4/2003 | Norris ............................. 705/37 |
| 2004/0093301 | A1 * | 5/2004 | Fitzpatrick et al. ............. 705/37 |
| 2006/0253361 | A1 * | 11/2006 | Robinson et al. ............... 705/35 |
| 2006/0282356 | A1 * | 12/2006 | Andres et al. ................... 705/35 |

(Continued)

OTHER PUBLICATIONS

International Search Report and Written Opinion from related International Application No. PCT/US2011/064134 mailed Apr. 24, 2012.

(Continued)

*Primary Examiner* — Narayanswamy Subramanian
*Assistant Examiner* — Stephanie M Ziegle
(74) *Attorney, Agent, or Firm* — Lempia Summerfield Katz LLC

(57) ABSTRACT

A computer implemented method for determining a margin requirement for a market participant includes maintaining, by a processor associated with an exchange, an exchange account reflecting an exchange position resulting from a trade executed on the exchange for a product available via the exchange, the exchange account being maintained separately from a custodian bank account associated with a custodian bank, the custodian bank account reflecting a repo position resulting from a repo transaction facilitated by the custodian bank between the market participant and a counterparty to the repo transaction. The method further includes receiving data reflective of the repo position via a communication interface between the exchange account and the custodian bank account, and determining the margin requirement for the market participant based on the received data and the exchange position.

42 Claims, 9 Drawing Sheets

(56) References Cited

U.S. PATENT DOCUMENTS

| | | |
|---|---|---|
| 2007/0118456 A1 | 5/2007 | Glinberg et al. |
| 2007/0192225 A1* | 8/2007 | Schroeder et al. .......... 705/36 R |
| 2008/0065532 A1* | 3/2008 | De La Motte .................. 705/39 |
| 2008/0120213 A1* | 5/2008 | Morik ............................. 705/35 |
| 2008/0215480 A1 | 9/2008 | Mordeca |
| 2008/0301062 A1* | 12/2008 | Glinberg et al. ............ 705/36 R |
| 2009/0063323 A1* | 3/2009 | Caffrey et al. .................. 705/37 |
| 2009/0099956 A1* | 4/2009 | Skyrm ............................ 705/37 |
| 2009/0248588 A1* | 10/2009 | Hadi et al. .................. 705/36 R |
| 2010/0131424 A1* | 5/2010 | Mose et al. ................. 705/36 R |
| 2010/0169205 A1* | 7/2010 | Labuszewski et al. .......... 705/37 |
| 2011/0153521 A1* | 6/2011 | Green et al. ................ 705/36 R |

OTHER PUBLICATIONS

"Tri-Party Repo Infrastructure Reform," Federal Reserve Bank of New York, pp. 1-68 (May 17, 2010).

* cited by examiner

FIG. 7

Trading Firm ABC - SHORT FUTURES, LONG TREASURY NOTE (Treasury prices fall)

| FUTURES MARKET | | | PRICES DOWN 0.5 | | | | 50% FUTURES MARGIN | | | CASH MARKET | | | PRICES DOWN 0.5 | | | |
|---|---|---|---|---|---|---|---|---|---|---|---|---|---|---|---|---|
| L/S | Futures | Futures Position | Futures Margin Requirement | Price | Daily P/L | Futures Notional Value | CREDIT | Net Margin | L/S | Treasury Face (Position) | Treasury MV | Price | Repo Financing | Daily P/L |
| S | 10Y Tsy | -1000 | $ (1,890,000) | 122.23 | | (100,000,000) | 1,134,000 | $ (756,000) | L | 100,000,000 | 113,328,125 | 113.33 | | |
| S | 10Y Tsy | -1000 | $ (1,890,000) | 122.78 | $ (546,875) | (100,000,000) | 1,134,000 | $ (756,000) | L | 100,000,000 | 113,687,500 | 113.69 | $ 111,433,750 | 359,375 |
| S | 10Y Tsy | -1000 | $ (1,890,000) | | | (100,000,000) | 1,134,000 | $ (756,000) | L | 100,000,000 | | 109.13 | $ 111,433,750 | (4,506,000) |

Collateral liquidated per BNY-CME Service Offering

Default Day

| | Futures | Cash Mkt |
|---|---|---|
| G/L on Liq of Futures | 3,000,000 | |
| Futures Margin | 756,000 | (2,226,250) |
| | 3,756,000 | (2,226,250) |
| | (2,226,250) | 2,226,250 |
| | 1,529,750 | 0 |

FIG. 8

CROSS MARGINING OF TRI-PARTY REPO TRANSACTIONS

CROSS-REFERENCE TO RELATED APPLICATION

This application claims the benefit of the filing date under 35 U.S.C. §119(e) of U.S. Provisional Application Ser. No. 61/421,533, filed Dec. 9, 2010, the entire disclosure of which is hereby incorporated by reference.

BACKGROUND

A repurchase agreement (or repo) transaction is a sale of securities coupled with an agreement to repurchase the securities at a specified price on a later date. A repo transaction is economically similar to a secured loan. Repo transactions usually involve borrowers selling securities (loan collateral) to lenders for cash today, with the understanding that the transaction is reversed on a specified end date. Repo transactions are often conducted on an overnight basis. "Term repo" transactions are held for a specific term, e.g., 1-week, 2-weeks, 1 month, etc. Borrowers that enter a repo transaction have "repoed out" the securities; lenders conduct "reverse repo" transactions. Repo trades are often collateralized by U.S. Treasury securities but may be secured by other mutually agreed collateral. At least $5 trillion (USD) is repoed daily in the U.S. with perhaps another € 6.4 trillion (EUR) in Europe.

A bilateral repo transaction is a transaction between two parties that involves an assumption of credit risk by one party with respect to the other. The cash lender loans cash to a borrower and receives the borrower's securities as collateral. The proceeds of the initial securities sale can be thought of as the principal amount of the loan, and the excess paid by the cash borrower to repurchase the securities corresponds with the interest paid on the loan, also known as the repo rate. The difference between the amount of cash loaned and the value of the collateral posted is called the "haircut." The haircut functions as a buffer for the lender against short-term variations in the value of the collateral. The haircut may also provide some protection against default.

Tri-party repo transactions are similar to bilateral repo transactions, but a third party, the tri-party agent, participates in the transaction along with the cash borrower and the cash lender or investor. Cash lenders, often money market mutual funds, have cash that they are willing to lend against collateral via the tri-party agent. Cash borrowers, typically fixed-income securities broker-dealers, seek to finance securities that can be used as collateral. Cash lenders use tri-party repos as investments that offer liquidity maximization, principal protection, and a small positive return, while cash borrowers rely on them as a major source of short-term funding. The tri-party agent facilitates transactions by providing operational services, such as custody of securities, settlement of cash and securities, valuation of collateral, and optimization tools to allocate collateral efficiently. In the U.S. market, government securities clearing banks serve as tri-party agents. Tri-party repo transactions usually settle on the books of one of two "Clearing Banks" in the U.S. market: Bank of New York Mellon (BNYM) and JP Morgan Chase (JPMC). The clearing bank, or custodian bank, is thus a third party involved in the repo transaction between the dealer (e.g., broker-dealer) or other borrower (e.g., party borrowing cash against securities collateral) and a cash investor or other lender (e.g., party lending cash against securities collateral.

Broker-dealers obtain a significant portion of financing for their own and their clients' securities inventories through the tri-party repo market. During the first quarter of 2010, the value of securities financed by tri-party repos averaged $1.7 trillion. The size of the market has declined notably since a peak of about $2.8 trillion in early 2008. The tri-party repo market nonetheless remains large and important, representing a significant part of the overall U.S. repo market in which market participants obtain financing against collateral and their counterparties invest cash secured by that collateral. Large U.S. securities firms and bank securities affiliates finance a large portion of their fixed income securities inventories, as well as some equity securities, via the tri-party repo market. This market also provides a variety of types of investors with the ability to manage cash balances by investing in a secured product, many of which are exempt securities. The importance of the U.S. repo market is underscored by the fact that it is the market in which the Federal Reserve operationally implements U.S. monetary policy.

The custodian services of the custodian banks provide protections that do not exist for bilateral repo investors or unsecured creditors. The tri-party repo structure developed in response to the desire by cash investors to have collateral held by a third-party agent. The collateral used to secure tri-party repos consists largely of U.S. Treasuries and agency mortgage-backed securities and debentures. As of the first quarter of 2010, these types of collateral represented slightly more than 80 percent of all collateral in the tri-party market. Other assets financed through tri-party repos include fixed-income securities and equities on deposit at the Depository Trust & Clearing Corporation (DTCC) as well as whole loans (currently less than one percent of assets financed). These asset types are primarily, but not exclusively, investment-grade securities. Some are materially less liquid than traditional government and agency securities.

In a typical overnight tri-party repo transaction, a cash lender and a cash borrower arrange their tri-party repo transactions bilaterally in the morning, agreeing on the tenor of the repo, the amount of cash provided, the value of the collateral provided, and the repo rate, among other parameters. The actual securities used as collateral are assigned later by the tri-party agent (or, in some cases, by the cash borrower), such that the securities meet the schedule of acceptable collateral specified by the cash lender. After the terms of the transaction are agreed upon, the dealer notifies the custodian bank. In some cases, only the very basic terms of the repo are communicated.

Late in the day, the custodian bank, adhering to the terms of the transaction provided by the borrower, settles the repos by simultaneously transferring collateral and cash between the borrower's and lender's cash and securities accounts at the custodian bank. In other words, securities are moved from the borrower's securities account to the lender's securities account and the corresponding cash amounts are transferred from the lender's cash account to the borrower's cash account. This process "locks" the borrower's securities in the lender's account. A dealer often allocates specific securities to each transaction using its clearing bank's or its own collateral optimization engine, as constrained by the schedule of acceptable collateral. Overnight, the lender holds the collateral, which exceeds the value of the cash loan by the value of the haircut, to offset the risk that the borrower will not be able to return the appropriate amount of cash the following day.

At 3:30 p.m. each day, the custodian bank extends credit to each dealer and returns the securities that were pledged as collateral so that the dealer can deliver any securities that are sold to buyers. This process of returning the collateral to the dealer is referred to as "unwinding" the repo. In overnight repo transactions, the unwinding each afternoon creates an overdraft in the dealer's cash account at its custodian bank when the custodian bank returns the repo collateral to the dealer and returns the cash borrowed by the dealer to the lender's demand deposit account.

Throughout the business day, broker-dealers buy, sell, and finance securities for their own and their client-owned positions. These securities may be delivered into and out of the dealer's securities account at its custodian bank. Either way, dealers typically do not have sufficient cash balances at their custodian bank to pay for their securities purchases during the day. Dealers use the cash they receive from lenders at the end of the day to extinguish these overdrafts.

Risk management practices may exacerbate the pressure on dealers during a credit crisis. During normal times, competitive dynamics and an abundance of market liquidity can lead investors and custodian banks to adopt liberal policies on collateral eligibility, the size and concentration of portfolios, and haircuts. During times of financial stress, the desire by investors and clearing banks to protect themselves can lead to sudden withdrawals of credit or sharp increases in margins and haircuts.

When faced with the prospect of counterparty default, neither custodian banks nor lenders may be well prepared to conduct an orderly liquidation of a large dealer's tri-party repo collateral. Either group may face challenges with respect to operational arrangements, sources of liquidity during a (potentially lengthy) liquidation period, and the impact of distressed asset prices on their own balance sheets.

BRIEF DESCRIPTION OF THE DRAWINGS

FIG. 7 is a tabular representation of an exemplary implementation of the disclosed tri-party repo cross margining methods and systems in connection with a default scenario for a tri-party repo transaction during which collateral (e.g., U.S. treasury) prices rise.

FIG. 8 is a tabular representation of an exemplary implementation of the disclosed tri-party repo cross margining methods and systems in connection with a default scenario for a tri-party repo transaction during which collateral (e.g., U.S. treasury) prices drop.

DETAILED DESCRIPTION

Figure 1:
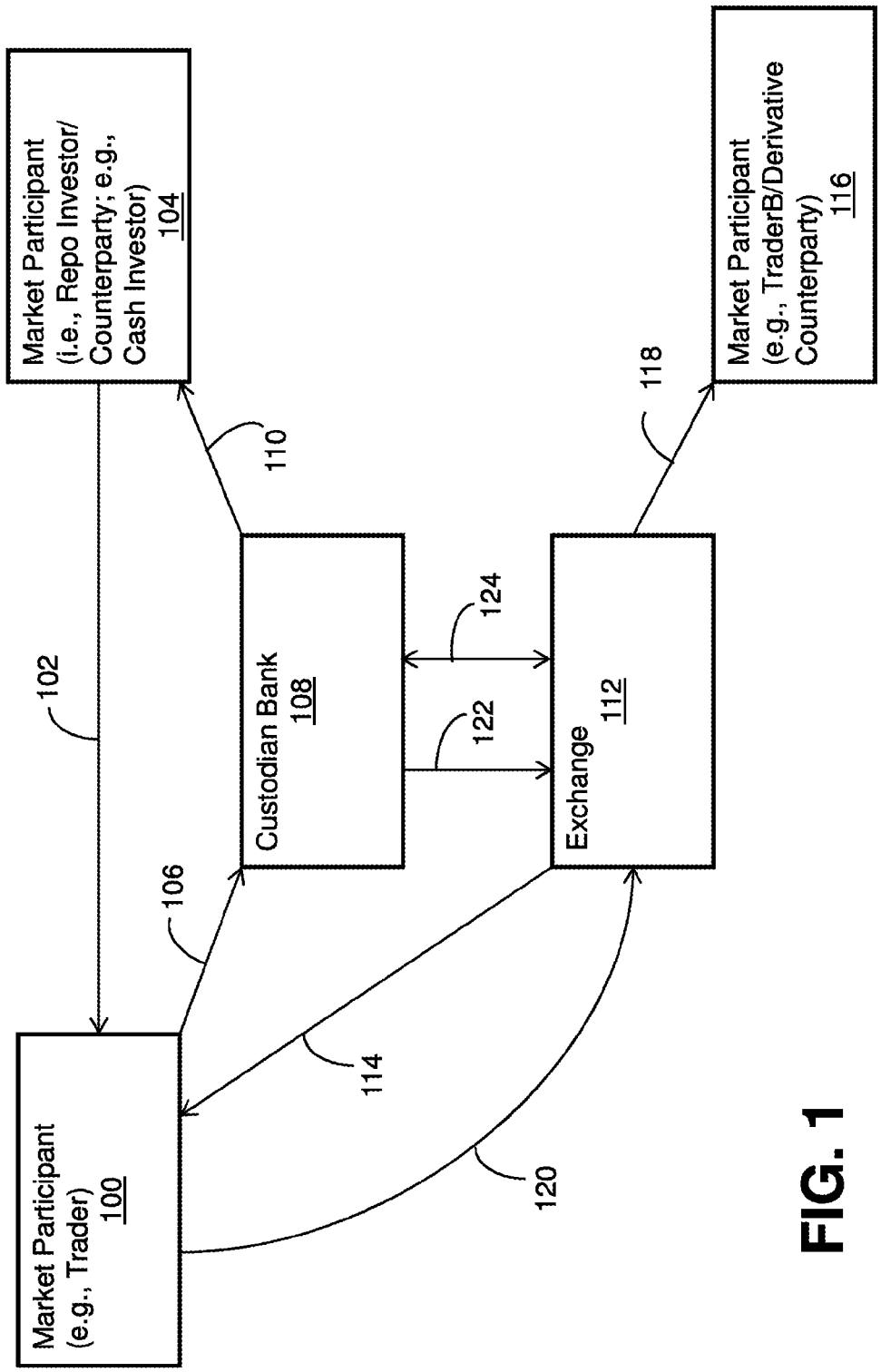
FIG. 1 depicts a schematic representation of an exemplary tri-party repo transaction involving one or more aspects of tri-party repo cross-margining as described herein.

One or more aspects of the disclosure are directed to (1) supporting effective risk management practices at an Exchange that are not overly burdensome to traders and other market participants, and/or (2) establishing orderly liquidation procedures upon default of a participant in the tri-party repo and derivatives markets. The disclosed methods and systems may lead to lowered or minimized margin requirements for market participants despite also lowering the risk of loss for Exchanges and tri-party repo lenders. In so doing, the disclosed methods and systems may additionally establish an operational framework or procedural arrangement for liquidation of assets in the event of a default of a market participant.

Typically, an Exchange, such as the Chicago Mercantile Exchange ("CME"), provides a "clearing house" which is a division of the Exchange through which all trades made must be confirmed, matched and settled each day until offset or delivered. The clearing house is an adjunct to the Exchange responsible for settling trading accounts, clearing trades, collecting and maintaining performance bond funds, regulating delivery and reporting trading data. Clearing is the procedure through which the Clearing House becomes buyer to each seller of a futures contract, and seller to each buyer, and assumes responsibility for protecting buyers and sellers from financial loss by assuring performance on each contract. This is effected through the clearing process, whereby transactions are matched. A clearing member is a firm qualified to clear trades through the Clearing House. The CME Clearing House clears, settles and guarantees all matched transactions in CME contracts occurring through its facilities. In addition, the CME Clearing House establishes and monitors financial requirements for clearing members and conveys certain clearing privileges in conjunction with the relevant exchange markets.

The Clearing House establishes clearing level performance bonds (margins) for the products of the Exchange and establishes minimum performance bond requirements for customers of the Exchange's products. A performance bond, also referred to as a margin, corresponds with the funds that must be deposited by a customer with his or her broker, by a broker with a clearing member or by a clearing member with the Clearing House, for the purpose of insuring the broker or Clearing House against loss on open futures or options contracts. This is not a part payment on a purchase. The performance bond helps to ensure the financial integrity of brokers, clearing members and the Exchange as a whole. The Performance Bond to Clearing House refers to the minimum dollar deposit which is required by the Clearing House from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. Once a position is established with initial margin, the customer must maintain maintenance margin, a drop in funds below which requires a deposit back to the maintenance margin levels, i.e. a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

Exchanges, such as, CME, derive their financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. Debt obligations from option contracts are also immediately removed, since the purchaser of an option must pay the premium (cost of the option) in full at the time of purchase. Sellers of options post performance bonds, discussed above, as determined by the Exchange according to the prevailing risk characteristics of the options sold. In the case of the CME, each business day by 6:40 a.m. Chicago time, based on the mark-to-the-market of all open positions to the previous trading day's settlement price, the Clearing House pays to or collects cash from each clearing member. This cash flow, known as settlement variation, is performed by CME's settlement banks based on instructions issued by the Clearing House. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the Clearing House has the authority to perform additional intra-day mark-to-the-market calculations on open positions and to call for immediate payment of settlement variation. CME's mark-to-the-market settlement system stands in direct contrast to the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

If a clearing member does not have sufficient performance bond collateral on deposit with the Clearing House, then the clearing member must meet a call for cash performance bond deposits by 6:40 a.m. and/or by 2:00 p.m. Chicago time, which results in a direct debit to the clearing member's account at one of CME's settlement banks.

In order to minimize risk to the Exchange while minimizing the burden on members, it is desirable to approximate the requisite performance bond or margin requirement as closely as possible to the actual positions of the members at any given time. Accordingly, there is an interest in accurate and flexible determination and/or adjustment of each member's margin requirement.

With reference now to FIG. 1, in a tri-party repo transaction, a market participant (e.g., a trader or broker) 100 can borrow cash 102 for a short period from another market participant 104, acting as a repo investor or counterparty. The borrowing market participant 100 pledges securities 106 as collateral for the loan. The collateral is held by a custodian bank 108, which acts as the tri-party agent. The custodian bank 108 accordingly provides the lending market participant 104 with rights 110 to the collateral under a repo transaction agreement. Investors with large cash balances and/or large portfolios of securities can thus lend these out and earn a return over time. In a tri-party repo transaction, both parties to the repo transaction may have cash and collateral accounts at the custodian bank 108, which may also be or include a clearing bank. The custodian bank 108 ensures that the collateral pledged is sufficient and meets eligibility requirements, and both counterparties 100, 104 to the transaction agree to use collateral prices supplied by the custodian bank 108.

With such collateral supporting the transaction and lowering risk of loss, a performance bond (or additional margin) has typically not been required in tri-party repo transactions. One or more aspects of the disclosed methods and systems nonetheless incorporate the benefits of a margin requirement into the implementation of tri-party repo transactions through a cross-margining technique involving a position correlated with the collateral, as described below.

Although described herein in the context of cash loans in which an investor places its money with the custodian bank 108, which in turn lends the money to another institution, practice of the disclosed methods and systems is not limited to cash loans. Non-cash assets may be loaned to the borrowing market participant 100 in some embodiments. Other assets owned by the borrowing market participant 100 may then be pledged as collateral for the loan. Such non-cash loans may be useful for market participants interested in obtaining, for instance, scarce assets for a temporary period. Further details regarding collateralized lending procedures and systems to support such non-cash loans, including so-called General Repo Futures (GRF) and Special Repo Futures (SRF), are described in U.S. Patent Publication No. 2010/0169205 ("Collateralized Lending Using a Central Counterparty"), the entire disclosure of which is incorporated by reference. To support such non-cash loans and/or other aspects of the transactions described herein, the custodian bank 108 may be a part of, or otherwise affiliated with another financial institution, such as an Exchange.

The types of assets pledged as collateral may also vary, regardless of the type and nature of the loaned asset. The disclosed methods and systems may be applied to support transactions involving a wide variety of types of collateral, despite the description of examples herein involving fixed income repo transactions and fixed income derivatives. Any product or instrument that can be used in tri-party repo transactions as collateral may be used in connection with the disclosed methods and systems, including, for instance, Treasury securities, agency debentures, mortgage-backed securities (MBS), corporate bonds, and collateralized debt obligations (CDOs).

In the exemplary embodiment shown in FIG. 1, economic risk offsets may be recognized between the repo transaction and another one or more additional transactions involving the market participant 100 to minimize or otherwise lower the margin requirement imposed on the market participant 100 by an Exchange 112 facilitating such additional transactions. The Exchange 112 facilitates the purchase and delivery of a financial product or instrument 114, such as an option contract or a futures contract, by the market participant 100, from another market participant 116, which serves as the counterparty receiving payment 118 in that transaction. In one example, the product is a fixed income derivative, such as a U.S. Treasury futures contract. As described further below, the Exchange 112 establishes and supports such derivatives markets via a clearing organization, such as a central counterparty clearing organization, e.g. CME Clearing. As described above, the Exchange 112 requires the market participant 100 to post a performance bond 120 to help prevent default and maintain the financial integrity of the Exchange 112.

As described herein, the performance bond, or margin requirement, of the market participant 100 may be minimized or otherwise lowered based on the nature and other details of the tri-party repo transaction. Data indicative of the details of the tri-party repo transaction may be transmitted 122 by the custodian bank 108 to the Exchange 112. The transmission may occur multiple times per day, on a regular, scheduled, or other basis. In one example, the tri-party repo transaction may include the purchase of a fixed income asset, such as U.S. Treasuries or MBS securities, and the terms of that purchase may be received by the Exchange 112 to determine whether the margin requirement for a purchase of a fixed income derivative product, such as a U.S. Treasury futures contract, may be lowered. The margin requirement may be lowered (e.g., offset) if the market participant has taken a long position (e.g., an expectation of rising prices) in the U.S. Treasury market by purchasing U.S. Treasury securities via money borrowed via the tri-party repo transaction (the repo loan position), while also obtaining a short position (e.g., an expectation of dropping prices) in the derivatives market (the exchange position). The margin requirement for the market participant may thus be lowered by the offsetting nature of the long and short positions.

An equivalently-sized, contra-position in Treasury securities will typically move inversely of the futures position. Further, a margin offset may be calculated by comparing the notional value of the futures position to the total market value of the Treasury security position. Contra Treasury security positions that have the same term to maturity as the futures may have the highest percentage offset (e.g., 10 year futures contracts vs. 10 year Treasury securities). Contra Treasury security positions with different terms to maturities than the futures contract may still qualify for offsets, but the offset percentage may be lower. The manner in which the margin offset percentage or ratio is predetermined or otherwise set for various pairs of securities or instruments may vary.

In one exemplary implementation, the Exchange 112 and the custodian bank 108 establish a relationship 124 to recognize the offsetting nature of the loan position (e.g., long) and the exchange position (e.g., the short position). The relationship 124 may include a number of rules regarding the margin offsets, liquidation procedures, and other aspects of the disclosed methods and systems. For example, one or more rules may specify the margin offset percentages for various loan/exchange position pairings. The relationship may include the creation of an agreement (or annex to another agreement, such as a Master Repurchase Agreement (MRA)) that recognizes the margin offset percentages and establishes liquidation procedures in the event of default.

In some arrangements, the relationship between the custodian bank 108 and the Exchange 112 may specify that risk offsets are available for other situations in which the positions are reversed or otherwise altered. The disclosed methods and systems are well-suited for application to various combinations or arrangements of exchange and loan positions (e.g., short and long positions) involving various securities and derivatives.

The disclosed methods and systems support the application and implementation of such risk offsets in a tri-party repo cross-margining arrangement that provides a number of benefits for the various parties involved in the loan and exchange positions. As described below, the disclosed methods and systems allow gains to be allocated towards losses between the exchange 112 and the repo counterparty 104 in the event of a default by the market participant 100. To that end, the disclosed methods and systems may establish that the exchange 112 recognize the fixed income (or other) repo positions (or other loan positions) maintained by the custodian bank 108. Once the custodian bank 108 shares the data reflecting the repo position(s) with the Exchange 112, the Exchange 112 may then compare the market participant's repo position with any open derivative (or other exchange) position(s) to determine if any risk offsets are appropriate. If the repo and exchange positions are correlated, the Exchange 112 may offset economic risk and lower the fixed income performance bond (PB) requirement (or margin) of the market participant 100.

Several of the benefits of the disclosed methods and systems relate to addressing a default of the market participant 100. The default may occur in connection with the loan position, the exchange position, or both. In the event of the market participant 100 defaults, the custodian bank 108 and/or the Exchange 112 may coordinate the liquidation (e.g., timing, etc.) of the repo loan and exchange positions. In some cases, the custodian bank 108 may act as an agent of the counterparty 104 and/or the Exchange 112 during such liquidation procedures. Alternatively or additionally, the custodian bank 108 may act as a transfer agent for any allocation of gains or losses between the Exchange 112 and the repo counterparty 104. The disclosed methods and systems facilitate gain/loss sharing between the various parties as described further below.

For these and other reasons, implantation of the disclosed methods and systems may benefit a number of parties involved either directly or indirectly in the repo loan and exchange transactions. For example, client firms of the exchange 112 may benefit from recognition of offsetting risk between fixed income repo and CME Group derivatives markets resulting in lower derivatives margin requirements. These client firms may include those firms that engage in Treasury cash-futures basis trading, firms that have a financed inventory of Treasury securities and also are holders of open interests in Group Interest Rate derivatives products offered via the Exchange 112, and firms that are clearing members of the Exchange 112. The custodian bank 108 may also benefit from the disclosed methods and systems via by offering its customers (e.g., cash and other investors) improved repo custodian service, including the potential for gains in the event of repo counterparty default. The exchange 112 may benefit from the disclosed methods and systems in a number of ways, including increased capital efficiencies for clearing members through recognition of risk offsets. Both of the repo loan counterparties (i.e., the investors 104 as well as the dealers and other market participants 100) may benefit from the disclosed methods and systems via the (investors/dealers) via the additional layer of potential protection provided by the Exchange 112 and the potential for gain and/or loss sharing in the event of a default.

The above-described and other benefits arise from the transactional arrangement shown in FIG. 1, where the market participant 100 is a party to the loan transaction and also holds a correlated exchange position. Those benefits notwithstanding, the disclosed methods and systems may also benefit the lending market participant 104 in the event the market participant 100 cannot repay the repo loan.

The disclosed methods and systems are well suited for application to transactional arrangements involving multiple lenders and/or multiple borrowers. The relationship between the custodian bank 108 and the Exchange 112 may be configured to address a transactional context in which the exchange position of a single one of the market participants 100 is offset by multiple repo loan lenders. The converse context in which the loan position of a single one of the repo investors 104 is used to offset the exchange positions of multiple exchange firms may also be addressed by the disclosed methods and systems. These "many-to-one" relationships may be managed via the rules specified in the relationship between the custodian bank 108 and the Exchange 112. For example, the relationship may determine the manner in which allocations of gains/losses are distributed among multiple repo loan counterparties. Risk offset tracking and other liquidation procedures may also be specified.

Figure 2:
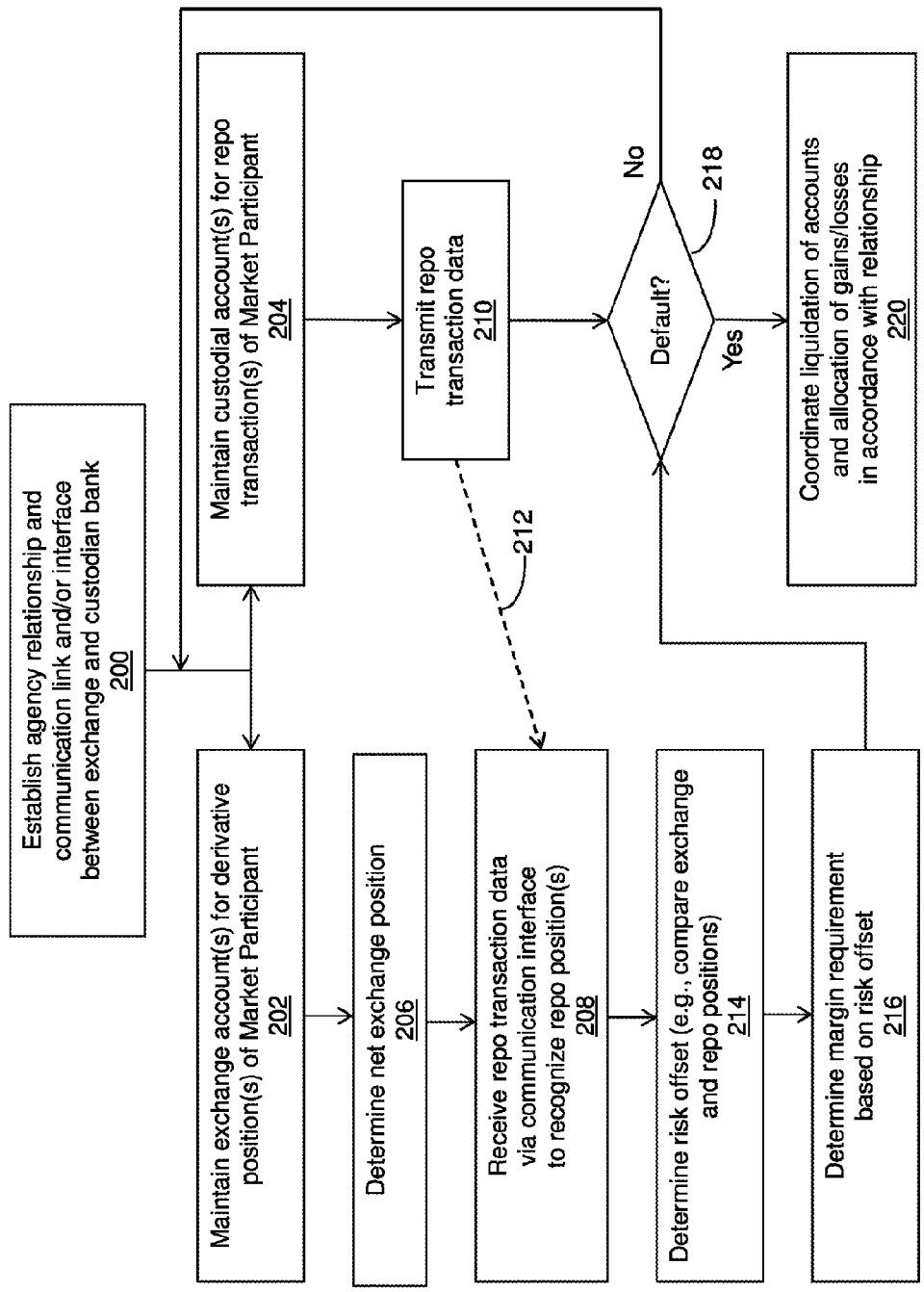
FIG. 2 depicts a flow chart showing one embodiment of a tri-party repo cross margining method.

FIG. 2 depicts a computer implemented method configured to determine a margin requirement for a market participant in accordance with an exemplary embodiment of the disclosed tri-party repo cross margining techniques. The method may begin with establishing a relationship between an exchange and a custodian bank (block 200). The relationship may specify a variety of parameters and/or aspects of a cross margining arrangement configured in accordance with the disclosure, including parameters for one or more loan transactions thereof, one or more exchange transactions thereof, margin offset and other rules, and liquidation procedures. The relationship may thus include a contractual relationship between the exchange and the custodian bank to recognize offsets between the exchange and the custodian bank accounts. The contractual relationship may establish one or more agency relationships between the exchange and the custodian bank. Such agency relationships may, for instance, be utilized in connection with the liquidation or other handling of collateral. The relationship may identify the custodian bank as a tri party repo agent for the loan transaction, and specify various other parameters of the tri-party repo transaction (e.g., collateral asset type, collateral asset value, interest rate, haircut, delivery date, term, etc.).

The relationship is not limited to specifying contractual or transactional parameters. The relationship may establish a communication link or interface between the exchange and the custodian bank. The communication interface may facilitate the transmission and reception of data reflective of one or more loan positions and/or one or more exchange positions involved in a risk offset procedure in accordance with the disclosed methods and systems.

In some embodiments, the relationship specifies a margin offset ratio or percentage between one or more products of the exchange and one or more asset types to be used as collateral for a loan position. The margin offset ratios may be used to determine margin requirement reductions, examples of which are provided below. A margin requirement for an exchange position may be reduced based on the collateral used in a loan transaction. The asset type used for collateral is determinative of a degree of correlation with the exchange product(s) of the exchange position. The margin offset ratio is representative of the degree of correlation. Assets with higher correlation justify higher risk offsets and, thus, greater margin requirement reductions. The relationship may specify a schedule of asset types and corresponding margin offset ratios.

One or more processors associated with the Exchange maintain an exchange account for a market participant (block 202). The exchange account reflects one or more exchange positions resulting from a trade(s) or other transaction(s) executed on the Exchange by the market participant. The trade(s) may be for any number of products available via the Exchange. Maintenance of the exchange account may precede, be concurrent with, or follow the establishment of the relationship between the Exchange and the custodian bank.

The exchange account is maintained separately from a custodian bank account associated with a custodian bank. The custodian bank account may be maintained by one or more processors associated with the custodian bank (block 204). The custodian bank account reflects one or more loan positions resulting from a loan transaction(s) facilitated by the custodian bank between the market participant and a counterparty to the loan transaction. Maintenance of the custodian bank account may precede, be concurrent with, or follow the establishment of the relationship between the Exchange and the custodian bank.

In embodiments where the market participant is executing multiple trades at one or more exchanges, the method may determine a net exchange position (block 206). In such cases, the exchange position is representative of the net exchange position. The net exchange position may be an inter-exchange position involving positions at multiple exchanges, an intra-exchange position involving multiple positions at a single exchange, or both an inter-exchange and an intra-exchange position. The processing of the multiple positions to determine such net positions may vary. For example, one-pot or two-pot techniques may be used to determine an inter-exchange position. Further details regarding such cross margining techniques, including hybrid techniques thereof, are set forth in U.S. Patent Publication No. 2007/0118456 ("Hybrid Cross-Margining"), the entire disclosure of which is incorporated by reference. The cross margining techniques may, but need not, also be used to determine a composite margin requirement for the net exchange position. Alternatively, the margin requirement determination may be addressed later in combination with the loan position, as described below. Regardless of the order of implementation, these cross margining techniques may assist the Exchange in determining a composite margin requirement for a wide variety of complex portfolios. One example of a complex portfolio is one that includes one or more futures, one or more tri-party repo transactions, and one or more cleared over-the-counter (OTC) swaps.

With the communication interface and other aspects of the relationship established, data may be transferred between the exchange and the custodian bank regarding the transactions. The data transfer may occur at any time relative to the net exchange position determination. In the depicted embodiment, data reflective of the loan position established via the tri-party repo transaction is received by the exchange (block 208). The custodian bank may initiate the data transfer of repo transaction data in any desired manner (block 210) using the communication link (or other interface) and any desired communication protocol or other transmission scheme 212. The data may specify a number of different parameters regarding the loan position, including parameters directed to the collateral provided by the market participant in support of the loan position. For example, the type of asset used for the collateral and the market value of the collateral may be specified.

The data reflective of the exchange position (or net exchange position) and the loan position may then be compared or otherwise analyzed in preparation for the margin requirement determination (block 214). The comparison or analysis may be directed to determining whether the positions are sufficiently correlated to warrant a risk offset. A look-up table or other database may be used to facilitate the analysis. The database may include a list or set of risk offset percentages or ratios for respective pairs (or other combinations) of assets that may be involved in the loan and exchange positions. For example, a risk offset percentage of 60% may be specified for a combination of a repo position involving collateral including 10 year U.S. Treasury securities and an exchange position including one or more 10 year U.S. Treasury futures contracts.

The margin requirement for the market participant is determined based on the data received via the communication interface and the data reflective of the exchange position (block 216). The margin requirement determination may include an adjustment or reduction of a previously determined margin requirement for the market participant. The previous margin requirement may be directed solely to the exchange position (or net exchange position). With the collateral of the loan position now incorporated into the determination, the margin requirement may be lowered in accordance with the risk offset appropriate for the exchange and loan positions. Examples of such adjustments are described below.

In some cases, the tri-party repo transaction includes a cash loan from a lending counterparty to the market participant. The money may be used by the market participant to finance the purchase of one or more assets, one or more of which may, in turn, be held by the custodian bank as the collateral for the loan. The nature of the asset(s) may vary, and may be any type of security instrument. In some examples, the security may have a high degree of correlation with one or more derivative assets obtained by the market participant via the Exchange. Nonetheless, the disclosed methods and systems are not limited to risk offsets involving derivatives of the asset used for collateral, and may instead involve exchange and repo position combinations characterized by a wide variety of marginable correlations. Examples include correlations between stock securities and S&P and other index futures contracts, and between corporate bonds and credit default swaps.

After the margin requirement determination, control may pass to a decision block 218 configured to detect a default by the market participant. The default may involve either the exchange position, the repo position, or both. The detection of a default may include data transfer via the communication interface. For example, a processor of the Exchange may transmit a request to the custodian bank to inquire into the status of the loan position. Alternatively or additionally, a processor of the custodian bank may transmit an alert or other status update regarding the loan position. Such data transfers may occur regularly and/or be triggered by predetermined events. If the market participant has not defaulted on the loan or the exchange position, then control may return to the procedures directed to general account maintenance (e.g., blocks 202, 204). If, however, the market participant has failed to return the cash or other asset as required via the tri-party repo transaction, then one or more processors of the Exchange and the custodian bank coordinate liquidation of the loan and exchange positions (block 220), including for instance liquidation of the collateral. Such liquidation may further include liquidation of other positions of the market participant maintained via the exchange and custodial accounts at the Exchange and custodian bank, respectively.

Liquidation of both the exchange position and the loan position may minimize losses for the lending counterparty to the tri-party repo transaction and/or the Exchange. In some cases, the correlation between the exchange and repo positions may result in a gain to be allocated between the parties. The contractual and other aspects of the relationship may specify the manner in which such allocation occurs. For example, the relationship may specify a first allocation procedure in the event of a net loss and a second allocation procedure different than the first allocation procedure in the event of a net gain.

Figure 3:
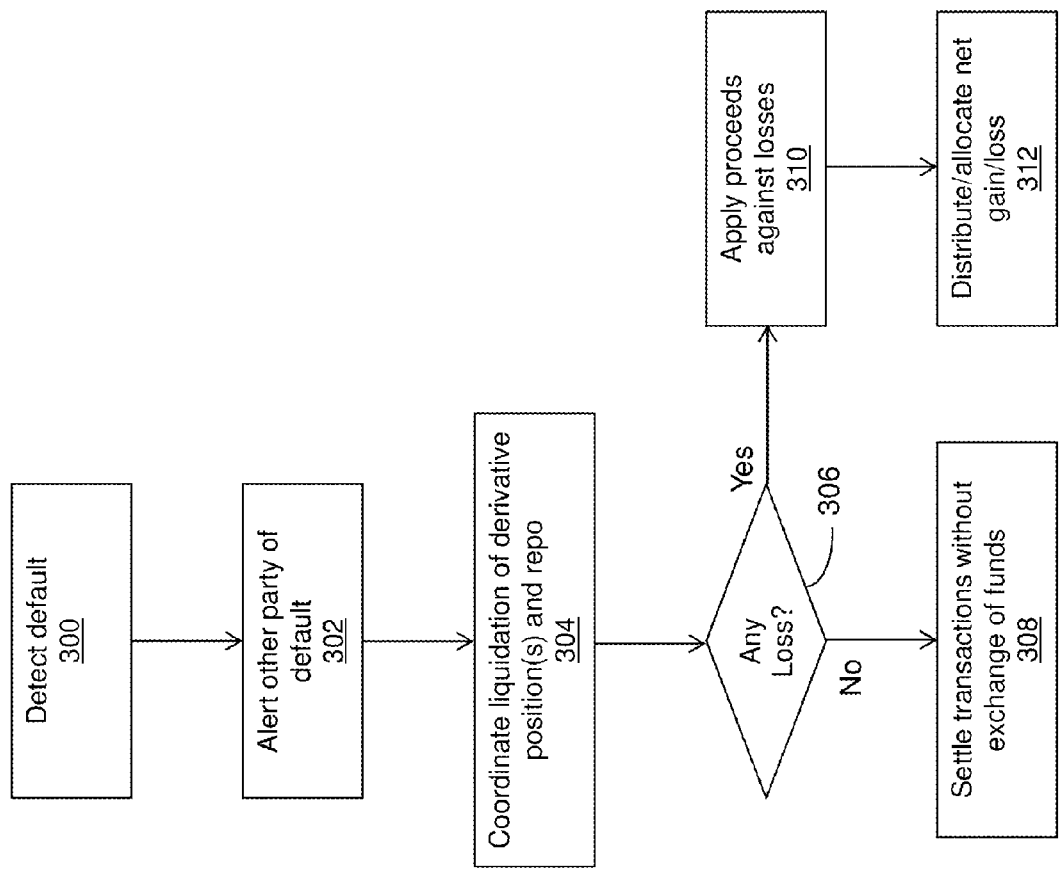
FIG. 3 depicts a flow chart showing liquidation procedures of the disclosed tri-party repo cross margining method in accordance with one embodiment.

FIG. 3 depicts an exemplary liquidation method in accordance with an embodiment in which gains or losses from the liquidation are allocated among the parties in accordance with the relationship between the Exchange and the custodian bank. The method includes detecting a default by the market participant (block 300), which is followed by an alert or other communication from the Exchange to the custodian bank, or vice versa (block 302). Liquidation of the derivatives or other holdings of the market participant may then be implemented by the Exchange, while one or both of the Exchange and the custodian bank also liquidates the collateral of the loan position (block 304). Such liquidation procedures and the coordination of the timing and other aspects thereof may vary.

The method also includes a determination by one or more processors of the Exchange and/or custodian bank as to whether a loss results from either liquidation action (block 306). Alternatively or additionally, the loss determination is based on the liquidation of both positions. In this example, if neither the liquidation of the exchange position and nor the liquidation of the loan position results in a loss, then the relationship may specify that the Exchange and the custodian bank settle the transactions without any exchange or transfer of funds (block 308). If the liquidation of either one or both of the positions results in a loss, then the relationship may specify that funds resulting from the liquidation are applied against the losses (block 310). A distribution of any net gain or allocation of a net loss may then occur in accordance with the rules set forth in the relationship (block 312). The gain/loss distribution/allocation may involve a variety of different sharing arrangements among the exchange, the custodian bank, and the counterparty. Such arrangements may also vary based on whether the exchange position is an intra-exchange account or inter-exchange net position. In such cases, another exchange may also share in any gain or loss.

Further details regarding the application of the liquidation procedures in accordance with one embodiment are set forth below in connection with FIGS. 7 and 8.

Figure 4:
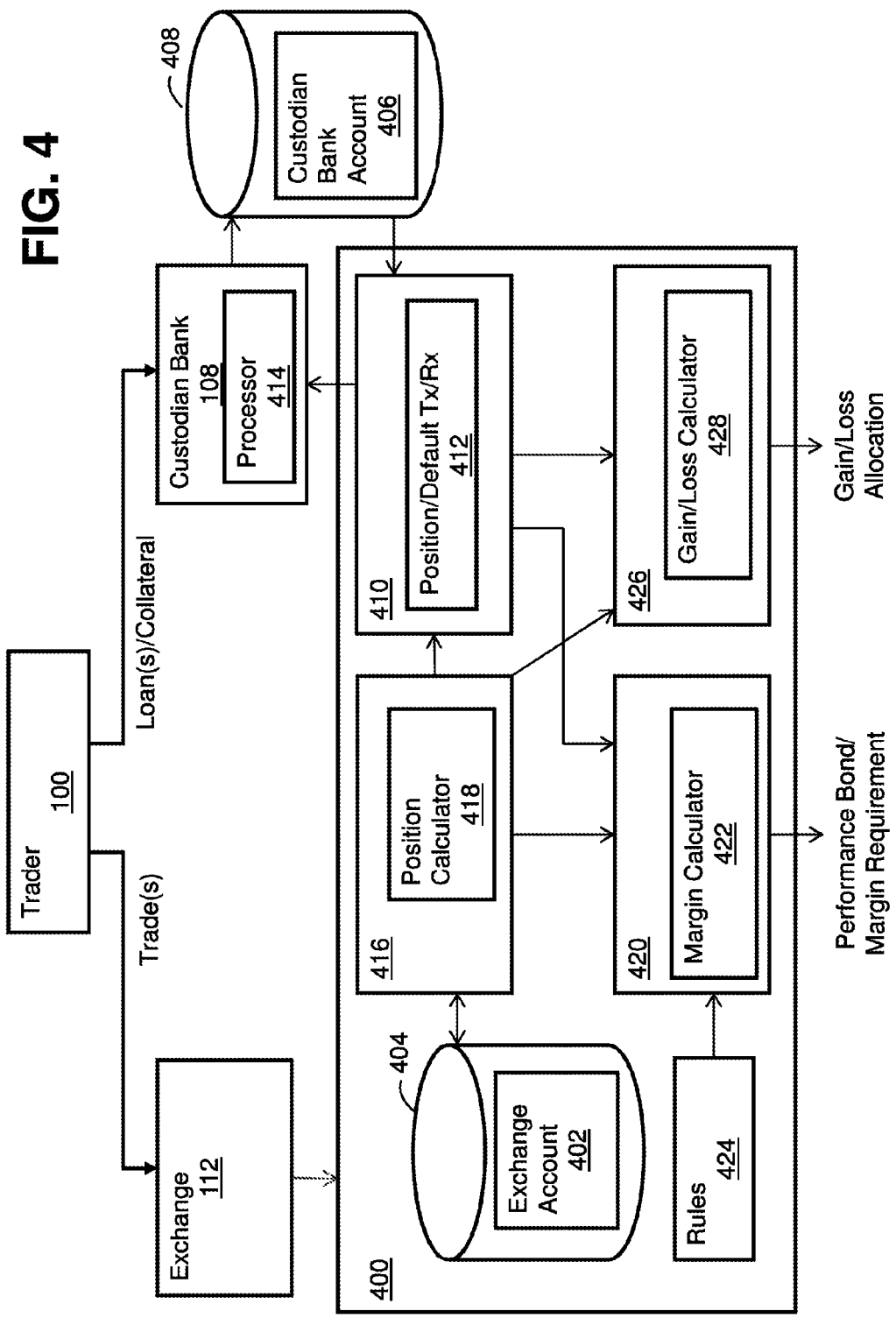
FIG. 4 depicts a block diagram one embodiment of a tri-party repo cross margining system configured in accordance with one or more aspects of the disclosure.

With reference to FIG. 4, where elements in common with other figures are indicated via common reference numerals, a system 400 for determining a margin requirement in accordance with one embodiment is depicted. The trader 100 implements one or more trades via the Exchange 112 resulting in one or more exchange positions, thereby necessitating the posting of a performance bond. The trader 100 also enters into one or more tri-party repo transactions with the custodian bank 108, offering up collateral in support thereof. The system 400 is configured to recognize the collateral to lower the margin requirement otherwise required of the trader 100. The margin requirement may be lowered to an extent the exchange position and the collateral are marginally correlated.

The system 400 includes an exchange account 402 for the market participant. Data representative of the exchange account 402 may be stored in a database 404. The exchange account reflects one or more positions resulting from one or more trades executed on the Exchange 112 for at least one product available via the Exchange 112. The exchange account 402 is maintained separately from a custodian bank account 406 in a database 408 for the market participant. The custodian bank account 406 reflects a repo position resulting from a repo transaction (e.g., a tri-party repo transaction) facilitated by the custodian bank 108 between the market participant and a counterparty to the loan transaction.

The system 400 includes a communication interface processor 410 configured to receive data from the database 408 reflective of the repo position. The data may include information regarding any number of repo positions. The repo position may thus be a net or other composite repo position representative of multiple repo positions. In this example, the communication interface processor 410 includes a transceiver 412 configured for data transfers relating to the repo and exchange positions and/or default by the market participant. The transceiver 412 may have transmitter and receiver components integrated to any desired extent. For example, the transceiver 412 may be configured to transmit and/or receive data packets indicative of the exchange position and/or the repo position. The transceiver 412 may also transmit and/or receive instructions, messages, or other communications regarding default. The data and other information received by the transceiver 412 may be generated by one or more processors 414 of the custodian bank 108. The processor(s) 414 may also be configured to receive data and information from the system 400 via the communication interface processor 410.

Data indicative of the exchange position(s) may be processed by an account maintenance processor 416 of the system 400. The account maintenance processor 416 may include a database management system or other system for handling queries to the database 404. Alternatively or additionally, the account maintenance processor 416 includes a position calculator 418 configured to determine the exchange position based on data from the exchange account(s) 402. The position calculator 418 may be configured to calculate the exchange position based on any number of exchange accounts 402 and/or any number of positions associated with the trader 100. For example, the exchange position may be a composite position representative of multiple positions taken by the trader 100 via the Exchange 112. The exchange position may also reflect the positions taken by the trader at one or more exchanges other than the Exchange 112. The account maintenance processor 416 may be coupled to the communication interface processor 410 to support transmission or reception of data related to the exchange position calculation(s).

The account maintenance processor 416 may also be coupled to a margin requirement processor 420 of the system 400 to incorporate the position data or other data from the database 404 into the margin requirement determination. In this example, the margin requirement processor 420 is coupled to the communication interface processor 410 to receive data indicative of the repo position(s) to incorporate the repo position data from the database 408 into the margin requirement determination. The margin requirement processor 420 may include a margin calculator 422 configured to determine a risk offset based on one or more rules 424 regarding, for instance, the degree to which the repo and exchange positions are correlated. With the risk offset percentages or ratios specified by the rules 424, the margin calculator 422 is operative to determine the margin requirement for the market participant based on the data indicative of the repo and exchange positions.

The rules 424 and/or other element of the system 400 may reflect the manner in which the exchange account 402 is coupled with the custodian bank account 406 via a contractual relationship between the Exchange 112 and the custodian bank 108 to recognize offsets between the exchange and the custodian bank accounts 402, 406. For example, the relationship may specify a margin offset ratio between an exchange product and a collateral type for the repo position. The margin requirement processor 420 may then be configured to determine the margin requirement in accordance with the margin offset ratio.

The system 400 also includes a liquidation processor 426 coupled with the exchange and the custodian bank accounts 402, 406 and operative to coordinate liquidation of the exchange position and the repo position upon detection of a default by the trader 100. The liquidation processor 426 may be coupled with the communication interface processor 410 to transmit or receive data indicative of the default. In this example, the liquidation processor 426 includes a gain/loss calculator 428 to determine the amount of any gain or loss resulting from the liquidation. The gain/loss calculator 428 may be operative to determine a gain or loss resulting from the liquidation and further operative to allocate the gain or loss among the Exchange 112, the custodian bank 108, and the lending counterparty.

The above-described components of the system 400 may be configured to address a wide variety of trading scenarios presented by the trader 100. The trader 100 may hold any number of exchange positions, any subset of which may be relevant to the system 400 and collectively referred to as the exchange position. The exchange position may involve or include any number of products involving any number of trades facilitated by the Exchange 112. The products may be of the same type or different types. In cases where the exchange position includes multiple products of varying type (e.g., a futures contract and an option contract), the system 400 may be configured to apply the disclosed cross margining techniques to each of the products having a marginable correlation with the loan position. The risk offset percentage may be weighted or otherwise configured to address the multiple products.

The Exchange 112 may include one or more exchanges. As described in the above-referenced U.S. patent publication, cross margining techniques may be used to consolidate the positions held by the market participant in the multiple exchanges into a net exchange position. The exchange account may thus reflect exchange positions held at any number of exchanges. The exchange position may accordingly correspond with only a portion of the exchange account(s). Further details regarding exemplary techniques for determining a net exchange position are set forth in the above-referenced U.S. patent publication. The custodian bank may include one or more custodian banks or other tri-party repo agents or other repo loan entities.

Figure 5:
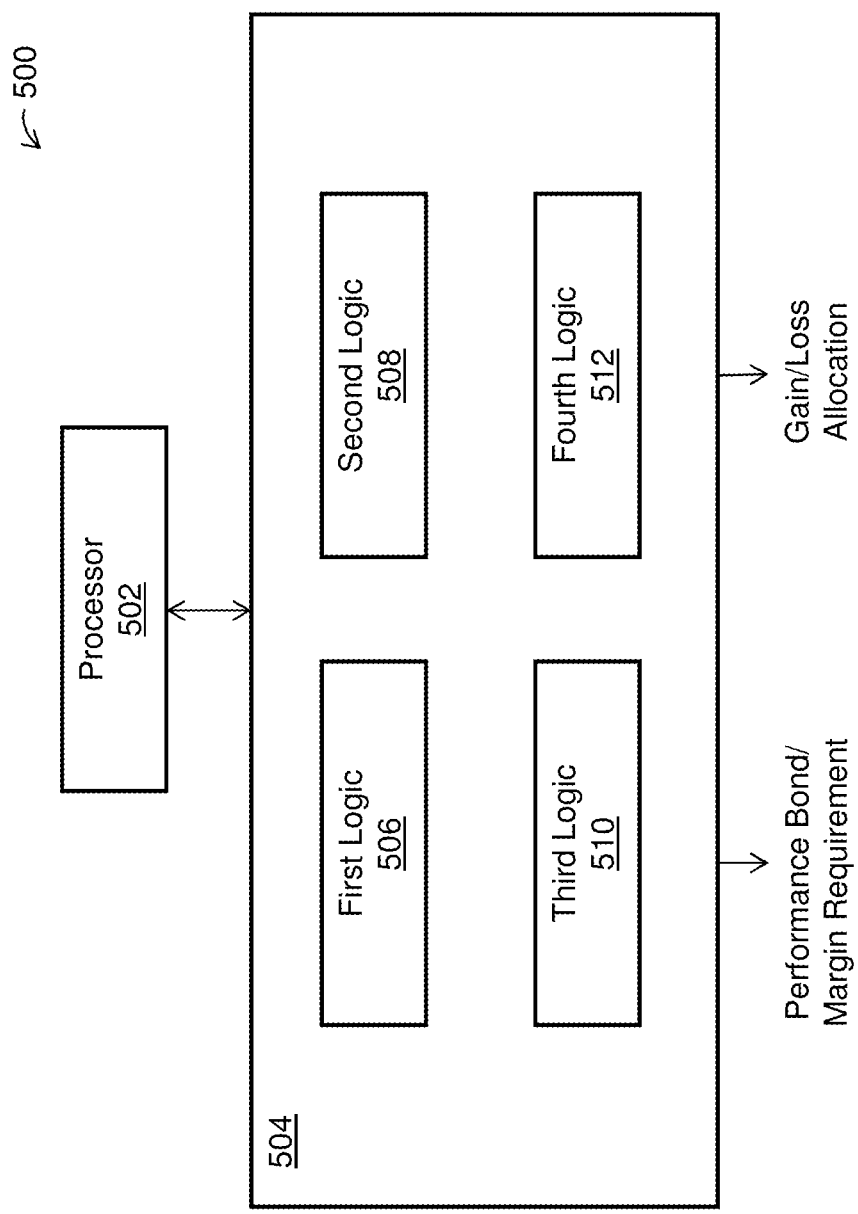
FIG. 5 depicts a block diagram showing another embodiment of a tri-party repo cross margining system configured in accordance with one or more aspects of the disclosure.

FIG. 5 depicts a system 500 for determining a margin requirement for a market participant in accordance with one embodiment. The system 500 includes a processor 502, which may correspond with or include any one or more of the above-described processors. The system 500 also includes a memory 504 coupled with the processor 502. The configuration of the memory 504 may vary, such that the memory 504 may include any number or combination of storage devices, data stores, databases, and memories. The memory 504 is configured for non-transitory storage of data and/or instructions directed to determining a margin requirement as described herein. The memory 504 may store such data and/or instructions in a volatile and/or non-volatile manner. Further details regarding examples of the processor 502 and the memory 504 are described below in connection with FIG. 6.

The system 500 includes first logic 506 stored in the memory 504 and executable by the processor 502 to maintain an exchange account reflecting an exchange position resulting from a trade executed on the exchange for a product available via the exchange. The exchange account is maintained separately from a custodian bank account associated with a custodian bank (e.g., a tri-party repo agent), as described above. The custodian bank account reflects a loan or repo position resulting from a loan or repo transaction (e.g., a tri-party repo transaction) facilitated by the custodian bank between the market participant and a counterparty to the repo transaction. The repo transaction may include a loan (e.g., a cash loan) from the counterparty to the market participant such that the repo position reflects collateral provided by the market participant. One or more assets offered by the market participant as collateral may include securities, the purchase of which may be financed via the repo transaction. The exchange position may be based on a product or instrument configured as a derivative asset of such securities. Such products are characterized by a high degree of correlation for purposes of risk offsets. Nonetheless, the exchange position and the repo position may be characterized by other marginable correlations.

The system 500 includes second logic 508, coupled with the first logic 506, stored in the memory 504 and executable by the processor 502 to receive data reflective of the repo position via a communication interface between the exchange account and the custodian bank account. The system 500 includes third logic 510, coupled with the first logic 506 and the second logic 508, stored in the memory 504 and executable by the processor 502 to determine the margin requirement for the market participant based on the received data and the exchange position.

In one or more embodiments, the first logic 506 is configured to establish a relationship between the exchange and the custodian bank. The relationship may include a contractual relationship between the exchange and the custodian bank to recognize offsets between the exchange and the custodian bank accounts. Alternatively or additionally, the relationship specifies a margin offset ratio between the product and a collateral type for the repo position. The third logic 510 may then be configured to determine the margin requirement in accordance with the margin offset ratio.

The system 500 includes fourth logic stored in the memory 504, executable by the processor 502, and coupled with the first logic 506 and the second logic 508 to coordinate liquidation of the exchange position and the repo position upon detection of a default by the market participant. The second logic 508 may be configured to receive further data reflective of the default via the communication interface. The fourth logic 512 may be configured to allocate a gain or loss resulting from the liquidation among the exchange, the custodian bank, and the counterparty.

Figure 6:
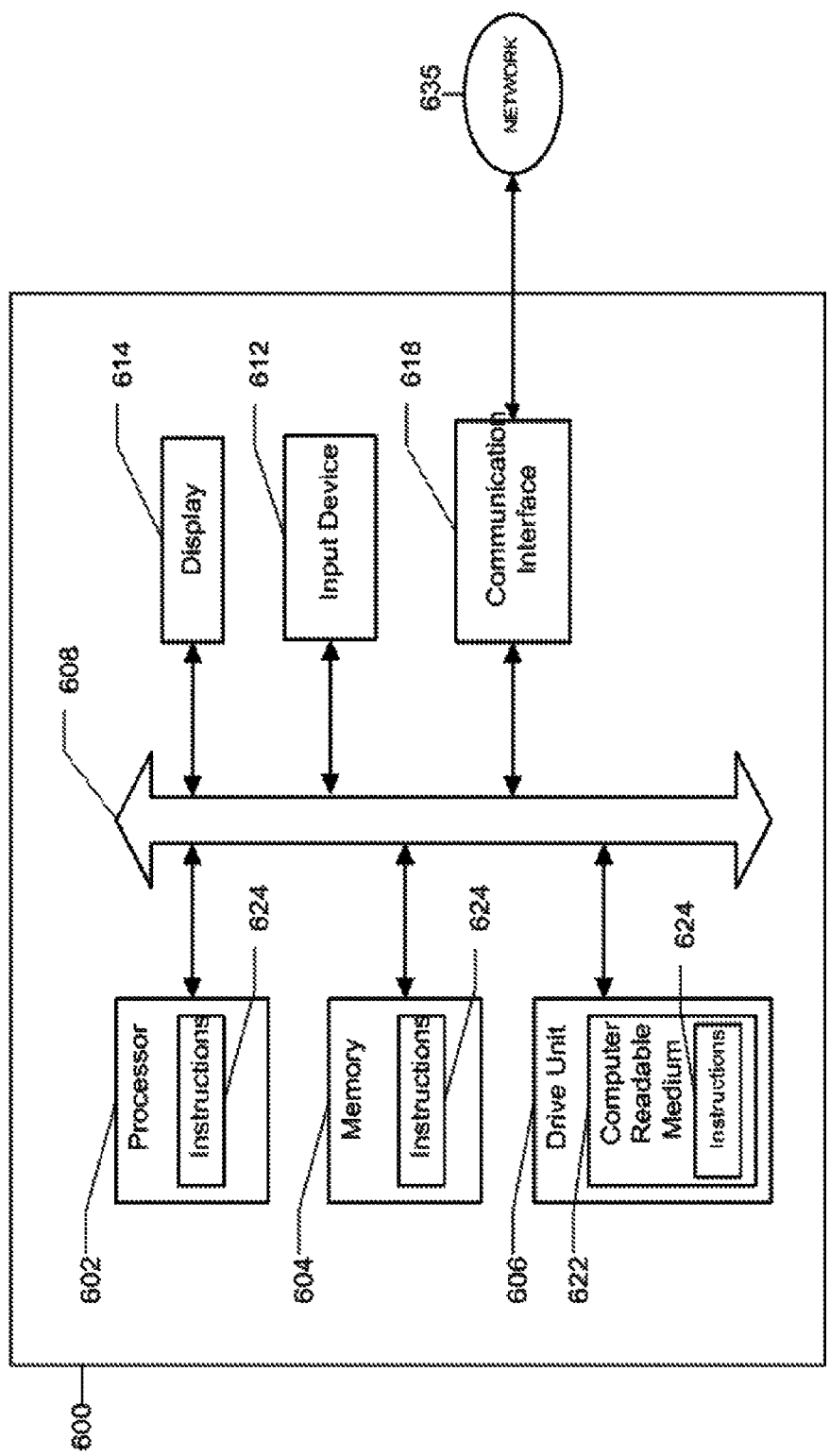
FIG. 6 shows an illustrative embodiment of a general computer system for implementing one or both of the methods of FIGS. 2 and 3, and/or for use with one or both of the systems of FIGS. 4 and 5.

Referring to FIG. 6, an illustrative embodiment of a general computer system 600 is shown. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices. Any of the components discussed above may be a computer system 600 or a component in the computer system 600. The computer system 600 may implement a match engine on behalf of an exchange, such as the Chicago Mercantile Exchange, of which the disclosed embodiments are a component thereof.

In a networked deployment, the computer system 600 may operate in the capacity of a server or as a client user computer in a client-server user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one or more embodiments, the memory 604 includes a cache or random access memory for the processor 602. In alternative embodiments, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the programmed processor 602 executing the instructions 624 stored in the memory 604. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 600 may further include a display unit 614, such as a liquid crystal display (LCD), an organic light emitting diode (OLED), a flat panel display, a solid state display, a cathode ray tube (CRT), a projector, a printer or other now known or later developed display device for outputting determined information. The display 614 may act as an interface for the user to see the functioning of the processor 602, or specifically as an interface with the software stored in the memory 604 or in the drive unit 606.

Additionally, the computer system 600 may include an input device 616 configured to allow a user to interact with any of the components of system 600. The input device 616 may be a number pad, a keyboard, or a cursor control device, such as a mouse, or a joystick, touch screen display, remote control or any other device operative to interact with the system 600.

In a particular embodiment, as depicted in FIG. 6, the computer system 600 may also include a disk or optical drive unit 606. The disk drive unit 606 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the memory 604 and/or within the processor 602 during execution by the computer system 600. The memory 604 and the processor 602 also may include computer-readable media as discussed above.

The present disclosure contemplates a computer-readable medium that includes instructions 624 or receives and executes instructions 624 responsive to a propagated signal, so that a device connected to a network 635 can communicate voice, video, audio, images or any other data over the network 635. Further, the instructions 624 may be transmitted or received over the network 635 via a communication interface 618. The communication interface 618 may be a part of the processor 602 or may be a separate component. The communication interface 618 may be created in software or may be a physical connection in hardware. The communication interface 618 is configured to connect with a network 635, external media, the display 614, or any other components in system 600, or combinations thereof. The connection with the network 635 may be a physical connection, such as a wired Ethernet connection or may be established wirelessly as discussed below. Likewise, the additional connections with other components of the system 600 may be physical connections or may be established wirelessly.

The network 635 may include wired networks, wireless networks, or combinations thereof. The wireless network may be a cellular telephone network, an 802.11, 802.16, 802.20, or WiMax network. Further, the network 635 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The disclosed computer programs (also known as a program, software, software application, script, or code) can be written in any form of programming language, including compiled or interpreted languages. The disclosed computer programs can be deployed in any form, including as a standalone program or as a module, component, subroutine, or other unit suitable for use in a computing environment. Such computer programs do not necessarily correspond to a file in a file system. Such programs can be stored in a portion of a file that holds other programs or data (e.g., one or more scripts stored in a markup language document), in a single file dedicated to the program in question, or in multiple coordinated files (e.g., files that store one or more modules, sub programs, or portions of code). Such computer programs can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Tri-Party Repo Cross Margining Example.

In one example, a trader has an exchange position that is short 1000 10-year U.S. Treasury futures contracts with a futures notional value of $100M. Without more, the margin requirement or performance bond for the exchange position would be $1.89M. The same trader finances via a tri-party repo transaction a purchase of the same amount ($100M) of 10 year Treasury notes with a coupon rate of 4.5% and a maturation date of May 2017. In order to obtain a loan, the trader must provide the custodian bank collateral (e.g., the Treasury notes) along with a haircut of $2.22M (e.g., 2% of the loan). The relationship established between the custodian bank and the Exchange stipulates that the margin offset provided by the futures contracts (relative to the 10-year Treasury notes) is 60%. The 60% offset results in a credit of about $1.134M toward the margin requirement for the trader. The trader's adjusted margin requirement is about $756,000 ($1.89M-$1.134M), and the total capital (exclusive of repo interest fees) required from the trader for the two transactions after the offset is $2.976M (the sum of the margin requirement and the haircut). The reduction in the capital requirement benefits traders interested in investing such capital rather than committed in a performance bond.

In the foregoing example, margin offsets are calculated by comparing the notional value of the futures position to the total market value of the Treasury security position. In some embodiments, the margin credit may be determined based on the amount of collateral available for the offset. If, for instance, the tri-party repo collateral is less than the notional value of the futures position, then the margin offset credit is not maximized, and instead is based on the lower collateral amount. If the tri-party repo collateral is more than the futures notional value, the extra collateral does not lower the margin any further than the offset resulting from equal amounts of collateral and notional value. Contra-security positions that have the same term to maturity as the futures contracts may have higher (e.g., the highest) percentage offset (e.g., 10-year futures vs. 10-year securities). Contra-security positions with different terms to maturities than the futures contracts may still qualify for offsets, but at a lower offset percentage.

The foregoing example is also addressed below in connection with liquidation procedures for handling default by the market participant in accordance with multiple embodiments. Generally, a commercial agreement stipulates actions which may be taken in the event that a particular trading entity defaults on the exchange position (e.g., derivatives) or the loan position (e.g., repo transaction). For example, in the event of a default, the custodian bank may take ownership and coordinate liquidation. Further, the custodian bank may unwind the tri-party repo transaction, if defaulted entity has cash to do so. The liquidation procedure may include a simultaneous or near-simultaneous close-out of the exchange and loan positions, or as otherwise defined in the relationship.

As described above, the liquidation procedures of one or more embodiments may include a number of coordinated actions, including without limitation: include, but are not limited to communication of the default detection to the other party or parties not experiencing the default (e.g., the exchange may communicate the default detection to the custodian bank, or vice versa), communications to effectuate the liquidation, and communications to affirm gain/loss levels. To facilitate such liquidation procedures, the custodian bank may dedicate a separate tri-party repo account for each market participant (e.g., trading firm) and repo counterparty. Such separate accounts may be established for ease of tracking.

The correlation of the exchange position (e.g., derivatives) and the loan position (e.g., the collateral) should minimize or limit risk of loss for the parties involved in the two transactions. To be correlated, the exchange and loan positions may involve offsetting short and long positions or other contrapositions. More generally, the correlation reflects an inverse relationship between the market values of the securities or instruments. An increase in the market value of one position should be matched by a corresponding decrease in the market value of the other position. The degree to which the increases and decreases typically match may be used to predetermine a desired offset ratio for the pair of asset types. The degree to which any decrease will be matched by a corresponding increase may also present an opportunity to share or otherwise allocate gains during liquidation. In some cases, the gains may exceed the total losses incurred by the other party or parties (i.e., a net gain), in which case a net gain may be shared or allocated. In other cases, the total losses may exceed the total gains (i.e., a net loss), in which case the gains may be distributed to share the net loss. In still other cases, liquidation of the exchange and loan positions may both result in gains (e.g., due to the haircut and/or the margin requirement), in which case no further distribution, sharing, or allocation may occur under the relationship.

One exemplary gain sharing example includes, after the Exchange and the custodian bank affirm final gain/loss of positions after liquidation, the custodian bank applying any gains in one market towards any losses in the opposing market. If the gain covers 100% of the losses, only the amount of gain equal to the loss may be transferred in some examples. The remaining gain may be allocated to the estate of the bankrupt trading entity. If the gain does not cover 100% of the losses, 100% of the gain may be allocated to the losing parties. If none of the parties are at a loss, funds are not exchanged.

In one or more embodiments, such gain sharing may limit funds shared to amounts over "cost basis" of the derivatives transaction or the repo transaction. Loss-sharing may not limit the amount of funds available for transfer.

Figure 7:
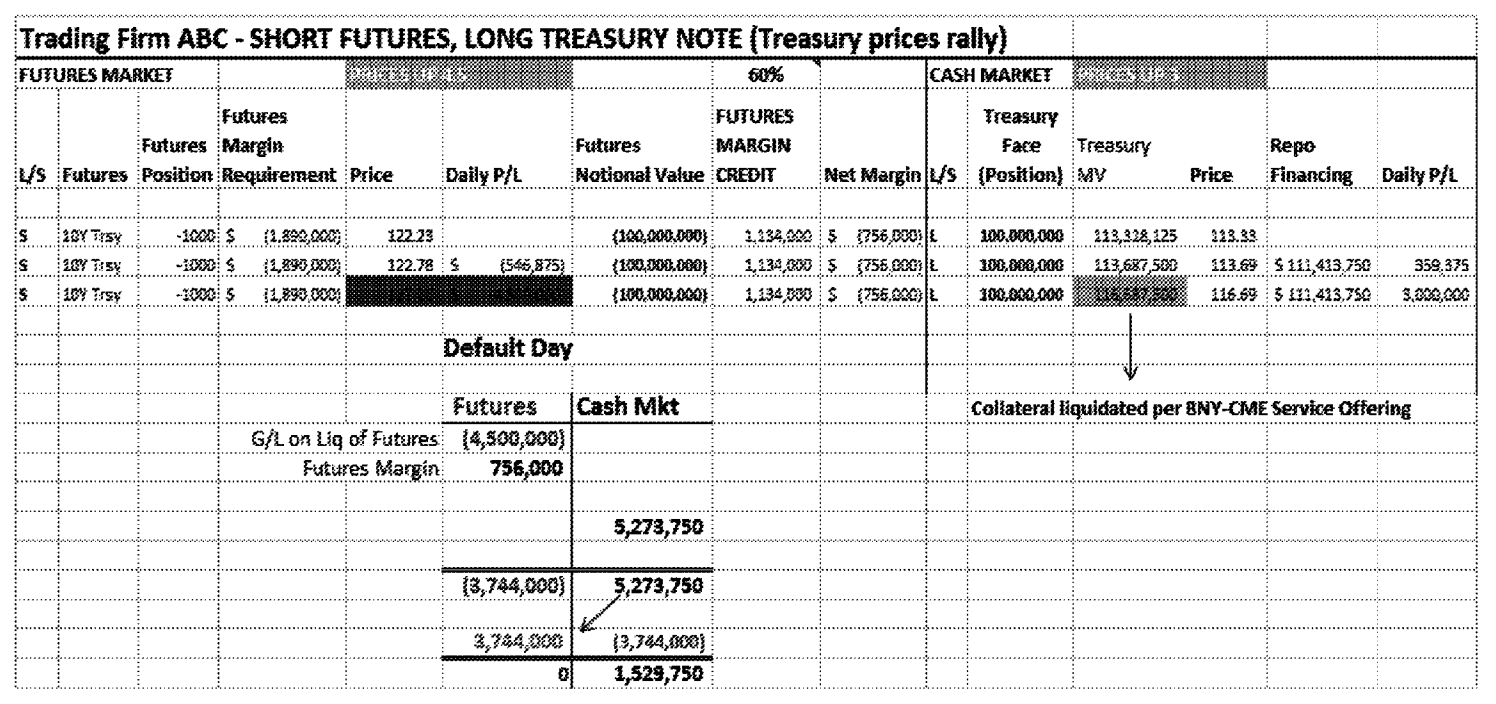

FIG. 7 depicts a representation of a default scenario in the above-described exemplary tri-party repo transaction where treasury prices have gone up. The exchange and loan positions are liquidated when the market value of the Treasury securities exceeds $116M and the corresponding loss for the futures contracts is about $4.5M. Even with the margin requirement reduced to $756,000 as described above, liquidation of the repo position results in a gain of $5,273,750 (Treasury market value—repo loan amount, including haircut), and a net gain of $1,529,750 as shown. The net gain or any predetermined percentages thereof may be distributed or allocated in accordance with the relationship.

FIG. 8 depicts a representation of a default scenario in a tri-party repo transaction where treasury prices have gone down. The exchange and repo positions are liquidated when the market value of the futures contracts results in a $3M gain, and the market value of the Treasuries ($109,187,500) results in a loss of $2,226,250 ($109,187,500-$111,413,750), which is lowered due to the haircut. The result is another net gain as shown to be distributed or allocated in accordance with the relationship.

Despite the protection provided by the extra collateral from the haircut (e.g., 2%), and the new protection provided by the correlated exchange position, in rare circumstances, a default may nonetheless result in a net loss for the repo counterparty and/or the Exchange. Such rare circumstances may involve a severe dislocation between the derivative and underlying securities markets. In the case of a default resulting in a net loss, one exemplary loss sharing example includes, after the Exchange and the custodian bank affirm any loss on positions after liquidation, the sharing of any losses by one party such that, if the Exchange has a loss, the custodian bank would share in the loss, and if the repo counterparty has a loss, the Exchange would share in the loss.

The methods and systems described herein may be used to determine margin offsets that lower margin requirements for market participants, such as client firms of an Exchange. Such firms may benefit from capital efficiencies, e.g. any eligible repo transacted under the new commercial agreement may be recognized as potential risk offset by the Exchange in order to lower margin requirements, and a potential credit enhancement, e.g. gain/loss-sharing with the Exchange as, for instance, stipulated in an agreement or other relationship definition, may provide an additional layer of protection to repo counterparties. Repo counterparties of such firms may benefit by becoming a party to a gain/loss-sharing arrangement with the Exchange, which may provide an additional layer of protection in the event of a trader default. The custodian bank may benefit by uniquely serving as repo custodian and may share associated repo position files with the Exchange. In the event of a firm default, the custodian bank may serve as the repo liquidation coordinator and gain/loss transfer agent between the Exchange and repo counterparties. The central counterparty clearing house, e.g. the Exchange, may also benefit via recognition of cash market offsetting risk, thereby creating an optimal trading environment and capital efficiencies.

Implementation of the disclosed methods and systems may also improve the efficiencies of the computer systems or other processors at the Exchange. As a result of the relationship and communication link with the custodian bank, one or more computer systems or other processors at the Exchange have access (e.g., convenient access) to data reflective of a clearing member firm's or other market participant's total portfolio. Such data access may be helpful in measuring each firm's level of credit risk to the Exchange (or the Exchange's clearing house). The computer systems or other processors involved in implementing risk measurement and/or management systems may thus be more effective and efficient in determining the risk level presented at any one point in time. For example, more complex risk measurement systems involving, for instance, machine learning, fuzzy logic, or other predictive engines, need not be implemented. Such efficiencies are not limited to those resulting from the access to the data reflective of the total portfolio.

Inter-Account Net Position (Risk Offset) Determination.

A wide variety of cross-margining arrangements and techniques may be used to determine (or in connection with determining) the inter-account net position (risk offset) in accordance with the disclosed methods and systems. For instance, cross-margining techniques may be useful in situations in which a market participant has a plurality of positions at an Exchange or at multiple Exchanges, against which the tri-party repo position(s) may be offset. Examples of suitable arrangements include the one-pot model, the two-pot model, and various hybrid arrangements of the one- and two-pot models. These arrangements provide for intra- and inter-exchange margin offsets, which, in turn, provide a comprehensive base for further margin offsets involving a tri-party repo position(s). The arrangements may help firms executing trades on different exchanges (e.g., for access to different products), involving different clearing organizations or agencies, and/or involving different product types (e.g., interest rate swaps, credit default swaps, etc. Further details regarding such cross-margining arrangements are set forth below.

A cross-margining agreement among derivatives clearing organizations and/or securities clearing agencies (or clearing organizations) is a method of offsetting risk among multiple exchanges which recognizes that a given market participant, e.g. a trader, may have offsetting positions at more than one clearing organization. For the various positions held by the market participant, each clearing organization has its own margin requirements based on the participant's positions held at that clearing organization which recognize offsetting positions therein. However, as each clearing organization is a separate entity which independently tracks and accounts for positions, the market participant is required to satisfy the margin requirements of each clearing organization separately. The separation of clearing organizations may be due to myriad of business and regulatory considerations. These margin requirements may present a significant burden on the market participant, as has been described. Cross-margining mechanisms may be used to provide a way to recognize offsetting positions across clearing organizations, potentially resulting in a lower overall margin burden on the market participant, while satisfying the needs of the participating clearing organizations to minimize the risk of loss. Cross-margining mechanisms are typically implemented by contractual agreements between clearing organizations. These agreements provide rules as to how margin requirements will be determined and how each participating clearing organization will receive their apportioned amount of the overall margin requirement of the market participant. As will be described, these rules may specify or lend themselves to implementation via communications links between the clearing organizations and logic which monitors transactions and accounts and performs the requisite determination of the overall margin requirement for the market participant, thereby directing the flow of margin payments, appropriately apportioned, to each participating clearing organization to satisfy the individual margin requirements.

Generally, market participants trade products at multiple exchanges that are cleared at one or more clearing organizations, including products which may have some form of correlation as to the risk of loss, e.g. a spread such as long and short positions on the same commodity. Where the products are cleared at the same clearing organization, the risk management mechanisms of the clearing organization may recognize this "marginable" correlation in the computation of the margin requirement, offsetting one position against the other and, thereby, reducing the margin requirement for the market participant. Where the products are traded on different clearing organizations, the disclosed cross-margining mechanisms attempt to recognize the marginable correlation as will be described.

One method of cross-margining, referred to as the "one bucket" or "one pot" approach or model, may rely on a joint account created specifically for cross-margining among two or more exchanges, the joint account being maintained separately from exchange-exclusive accounts and reflecting positions resulting from trades of products from any of the participating exchanges. For example, in recognition of the growing linkages among the markets for exchange-traded equity derivative products, as well as the need to promote efficient clearing procedures and to focus on the true inter-market risk exposure of clearing members, CME, in conjunction with other exchanges, such as the Options Clearing Corporation (OCC), has developed a cross-margining system with respect to market professionals and proprietary accounts. Cross-margining allows participating clearing corporations to recognize Clearing Members' inter-market hedges across the respective products they clear. By combining the positions of joint or affiliated clearing members in certain broad-based equity index futures and options into a single portfolio, and utilizing the sophisticated risk-based systems of each clearing organization, a single performance bond requirement across both markets is determined. Participating clearing corporations work together to the benefit of the Clearing Members. The clearing organizations jointly hold a first lien on and security interest in the positions in cross-margined accounts. All performance bond deposits associated with these accounts are jointly held or held on a pro-rata basis. The cross-margining system significantly enhances both the efficiency and financial integrity of the clearing system by treating all positions as being held in the same account, which allows gains accruing to futures or options positions to be immediately available to meet the requirements for funds from losing positions. This system utilizes a risk-based portfolio methodology. The system is derived from the actual risk of inter-market hedged positions after combining Clearing Members' related options and futures positions and reduces participating Clearing Members' combined margin requirements, if hedged. Further, the system provides for greater liquidity through net settlements, enhances the financial integrity of participating clearing organization's clearance and settlement systems and reduces systematic risk. In the event that a clearing organization suspends a cross-margining member, the positions in the cross-margin accounts are liquidated and all performance bond collateral is converted to cash and applied toward each clearing organization's costs of liquidating the cross-margin accounts. For instance, CME and the OCC are each entitled to proportional shares of any surplus to apply toward other obligations of the clearing member; if one clearing organization did not need its entire share of the surplus, the excess may be made available to the other clearing organizations.

Another method of cross-margining, referred to as the "two bucket" or "two pot" approach or model, relies on an agreement among participating exchanges to recognize offsetting positions between the individual accounts maintained by each participating exchange. For example, CME also maintains other cross-margin agreements with other Exchanges, such as the London Clearing House and Fixed Income Clearing Corporation. These programs may involve the cross-margining of selected interest rate products. As opposed to the one bucket model, the two bucket model recognizes all internal exchange spreads first before looking across exchanges. In the event that a clearing organization suspends a CME/LCH cross-margining participant, the cross-margined positions are liquidated and performance bond collateral is converted to cash at each respective clearing organization. If as a result of the liquidation of cross-margined positions and performance bond there is a resulting cross-margin loss, there will be a cross-margin guarantee payment from one clearing organization to the other to share the loss.

One benefit of the one bucket model is that it looks at the portfolio as a whole, creating the most optimal spread credits among all available products, resulting in an optimal (lowest possible) margin requirement. This will use maximum available delta in the eligible positions for risk-offsetting. It brings more efficiency to highly correlated products/positions in a 1 bucket spreading model. In other words, the performance bond savings amount may be greater than the 2 bucket model since the risk offset eligible deltas from two separate (or multiple) exchange/clearing organizations can be concentrated into 1 bucket without the normal process of their respective existing intra or inter-commodity spreads taking priority. Operationally, it is easier to maintain the risk offset rules and rates since the 1 bucket model works as one virtual centralized clearing system despite the fact that position deltas originate from two separate (or multiple) exchanges/clearing organizations.

Accordingly, the one bucket model offers greater efficiency and amount in savings of performance bond requirement. However, it is expensive to operate for all participants and may be legally complicated (especially dealing with international exchanges under different regulatory regimes). The two bucket model offers ease of execution/implementation, and is generally inexpensive to operate for all participants with the expense of much less savings and efficiency of performance bond requirement. Additionally, it may also be less legally complicated from regulatory perspective. In situations involving highly correlated products and the desire to recognize greater risk-offsets in exchange for operational complexities, the one bucket model is preferred. Alternatively, if the provision of some savings in the performance bond is preferred without incurring expensive operational and system implementation costs for both the users and providers, the two bucket approach is preferred.

While a clearing organization may elect to implement a 1 bucket model or a 2 bucket model with another exchange, other embodiments may involve a hybrid of the 1 and 2 bucket models. The cross-margining system may thus handle participants that deal with more than two clearing organizations and consolidates the clearing organization space without requiring that the clearing organizations merge into a single organization. This may be useful, for example, in situations where all of the participating clearing organizations cannot join together as a single organization, such as for regulatory reasons. Further, the system may be applicable beyond futures to any markets that require any type of collateral movement or any type of variation/mark to market movement. Further, the disclosed embodiments are applicable to any instruments that can be converted to novation. i.e. permit the substitution of the clearing house for the opposite contracting party, and as long as they are correlated, they can be offset in this model.

Further details regarding the one-pot, two-pot, and hybrid cross-margining techniques are set forth in the above-referenced U.S. patent publication.

The disclosed methods and systems are well suited for use in cross margining involving a variety of different loan transactions. The loan transaction may be configured in a wide variety of ways, and may include a wide variety of collateral structures. Various collateralized lending systems using a central counterparty may be utilized to generate the loan transaction. For example, a lending entity/lender may place orders to enter into long contracts with an intermediary, i.e. a central counterparty, obligating them to lend an asset, or portion thereof, such as cash or a particular security. Borrowing entities/borrowers may place orders to enter into short contracts with the intermediary obligating them to borrow an asset or a substantial equivalent thereof, such as cash or a particular security. The intermediary may then match and settle appropriate orders. The net effect acts like a lending transaction between the lending entity and the borrowing entity but with the risk of default by the borrowing entity undertaken by the intermediary rather than the lending entity. The contracts, which may be referred to as "General Repo Futures" ("GRF") and "Special Repo Futures" ("SRF"), may be characterized by a number of parameters, including, for instance, the value, type or amount of an asset to be lent/borrowed, the interest rate, the delivery/settlement date, i.e. when the loan begins, the term of the loan, or combinations thereof. The asset may be cash or one or more particular securities, such as Treasury securities. The intermediary anonymously matches counter-orders from one or more borrowing entities and one or more lending entities and facilitates, at the settlement/delivery date, the lending transaction by novating itself into the matched transaction between the borrowing entity(s) and the lending entity(s), i.e., the lending entity(s) tenders the asset, or portion thereof, to the intermediary, such as to a clearing entity operated by the intermediary, and the intermediary/clearing entity loans/delivers the asset, or portion thereof, or a substantial equivalent, to the borrowing entity(s). In one or more embodiments, the intermediary/clearing entity may collect collateral from the borrowing entity(s) in exchange for the loan, the amount required varying based on the value of the loan and/or the nature of the collateral. The intermediary may then administer the loan upon delivery until it expires. Upon expiration of the loan, the intermediary/clearing entity facilitates redemption of the loan, e.g. repayment by the borrowing entity(s) to the central counterparty, and return of the collateral, and repayment by the central counterparty to the lending entity(s), as well as collection and payment of interest, fees, etc. As a result of the novation, the transactions between the central counterparty and the lending entity(s) and borrowing entity(s) are independent and guaranteed. Thereby, the ability to borrow is simplified and the risk of loss due to borrower default and/or management of the collateral is absorbed by the central counterparty, encouraging borrowing activity by prospective borrowers and lending activity by prospective lenders, resulting in increased credit availability. Other features of the disclosed embodiments will be described below.

Market participants, given the myriad of expirations and strike listings available from which to choose in an options market, may utilize index option products to engineer loan transactions for use with the disclosed methods and systems. One possibility is to use Index Option Box Spreads to simulate collateralized lending and borrowing. In some embodiments, the above-described repo loan transactions may include one or more of such index option box spreads. Since the repayment is a fixed amount in index option box spreads and is not subject to market risk, the collateral requirement for the borrower will amount to the value of the loan. The precise level of collateral requirement will change slightly given normal changes in the options mark-to-market prices. Since the combination is nothing more than a fixed rate loan, the mark-to-market value of the options combination will not fluctuate significantly in relation to the principal. The borrower can post liquid securities at the Exchange, subject to the "haircut schedule" in effect. As such, the borrower will slightly over-collateralize the loan. This is very similar to a repo transaction, in which the borrower transfers securities to the lender at a slightly over-collateralized level to ensure performance. In an options box trade, the collateral resides at the Exchange instead of being passed to the lender. It is as if the lender has a claim on the Exchange. This claim can be used for margin offset purposes for the lenders' other options and futures positions at the Exchange (or another exchange). Further details regarding index option combinations are set forth in the above-referenced U.S. patent publication.

In the above-described embodiment involving index combinations, the custodian bank is or includes an Exchange. The nature of the custodian bank may vary considerably from the typical tri-party repo custodian bank that handles repo transactions involving U.S. Treasuries and other fixed income securities.

Margin Offsets in Collateralized Lending of Non-Cash Assets.

The disclosed methods and systems are not limited to margin offsets involving cash loans. The lender may loan an asset other than cash, such as a security. Such non-cash loans may be useful in situations where the non-cash asset is scarce, as described below. In such cases, one or both of the parties to the loan may use the results of the tri-party repo transaction as a basis for lowering their respective margin requirements. The borrower is not using the tri-party repo transaction to finance the purchase of a security, as described above. The borrower wants the scarce asset rather than cash. For as long as the borrower holds the scarce asset during the term of the tri-party repo transaction, the non-scarce asset (e.g., a security) pledged by the borrower may be used for margin offset purposes. At the same time, during the term of the tri-party repo transaction, the lender may also use the scarce collateral provided by the lender to lower its margin requirement.

In contrast to utilizing box spreads of equity index options, the disclosed embodiments relate to an General Collateralized Lending Facility ("General CLF") contract and Special Collateralized Lending Facility ("Special CLF") contract, also referred to as "General Repo Futures" ("GRF") contract and "Special Repo Futures" ("SRF") contracts, representing a transparent, secured, market-driven lending facility. Similar to Option Box Spreads, they leverage the collateral management facilities of an exchange clearing house ("CH"), such as the CME CH, and provide an alternative to traditional repurchase agreement (repo) lending markets.

GRF's may provide an alternative lending facility to repo transactions, denominated, for example, in either US dollars ($ or USD) or Euros (€ or EUR). In one or more embodiments, a GRF contract calls for the delivery of a 3rd party custodian repurchase (repo) agreement upon delivery, administered by the CH, which leverages the CH's collateral management capabilities, providing a secure alternative to traditional repo markets. GRF contracts may be based upon an invariable notional value (NV) upon origination of, for example, ($/€)100,000 or such other fixed amount as may be determined by the Exchange. Upon purchase, longs (lenders) pay ($/€)100,000 or tender another asset, or portion thereof, as will described. This cash/asset, or a substantial equivalent thereof, is passed through the CH to the account of shorts (borrowers). Shorts may be required to post collateral equivalent in value to loaned value, such as the ($/€)100,000, in a form specified by the CH, as opposed to the lending party, such as Treasuries and other forms of collateral, sometimes subject to a haircut, which are considered good or general collateral. Cash and collateral may then be returned and interest may be paid from short to long on a specified end date. Thus, the delivery of a GRF contract may resemble a tri-party repo agreement but without the 3rd party custody arrangements which characterizes such an agreement. In summary, GRF contracts allow participants to lock-in short-term loan rates, enjoying the financial surety of the CH instead of accepting counterparty credit risks.

In some situations, certain securities, including Treasury securities or stocks, are in short supply in the cash markets. Thus, in one or more embodiments, lenders may accept below market rates to lend that security on a short-term basis. These securities are said to go "on special." A contract for the lending of a particular security, also referred to as a Special Collateralized Lending Facility ("Special CLF") contract or Special Repo Futures ("SRF") contract, may require a specified or special piece of collateral to be passed from long to short with the provision that such specified or special collateral is subsequently returned. Because shorts are interested in securing particular securities, cash is not transferred upon initial transaction. Short positions may be secured with general collateral equal in value to the special collateral plus a CH-specified risk premium. Special GRF contracts may be quoted as an interest rate differential on special vs. general collateral.

Figure 9:
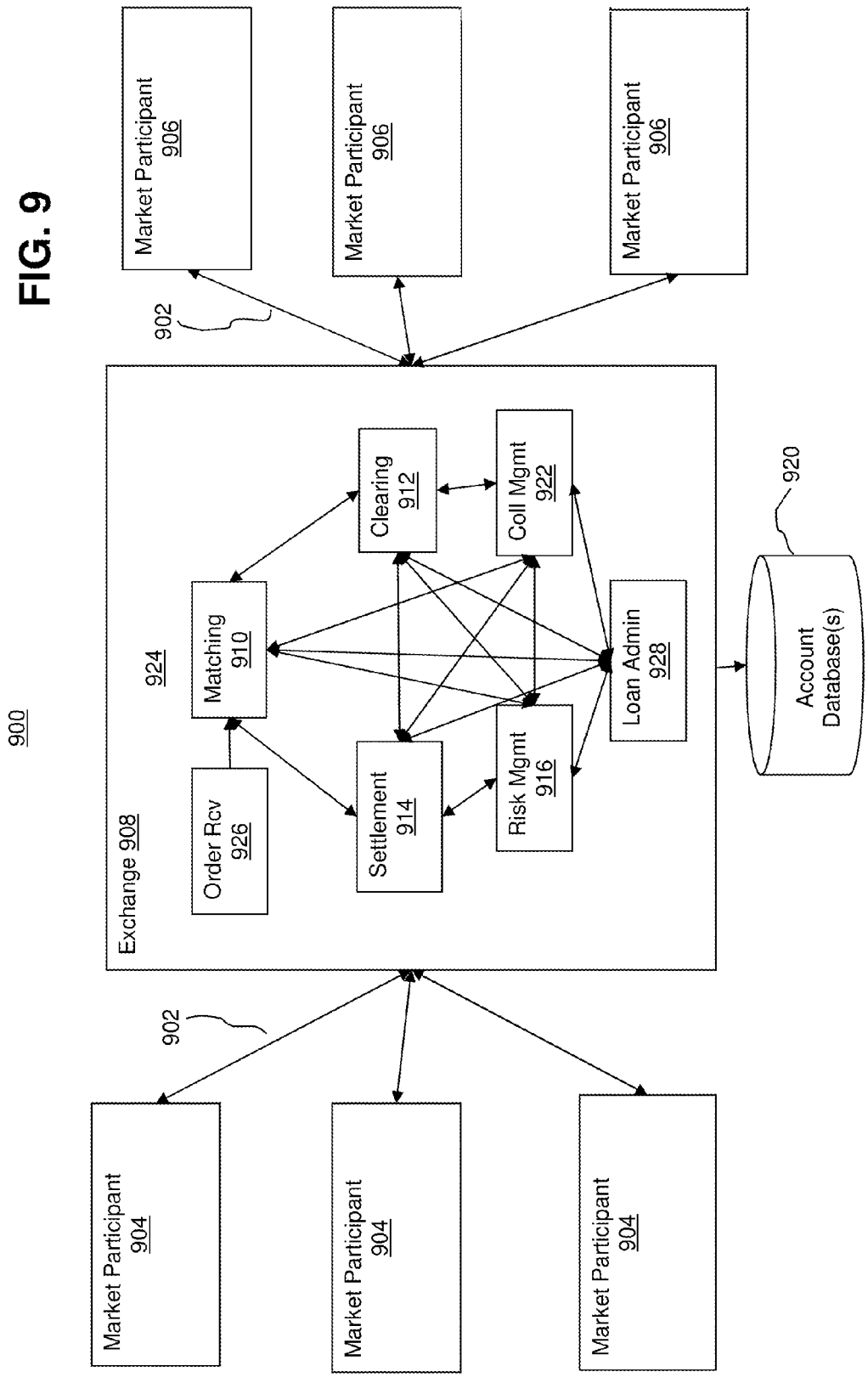
FIG. 9 depicts a block diagram of an exemplary exchange system and framework for implementing one or more of the disclosed tri-party cross margining methods and/or for use with one or more of the disclosed tri-party cross margining systems.

Referring now to FIG. 9, there is shown a block diagram of an exemplary network 900 for trading contracts to obtain the above-described exchange positions. The network 900 couples market participants 904, 906, with an exchange 908, such as the CME, also referred to as a central counterparty or intermediary, via a communications network 902, such as the Internet, an intranet or other public or private, secured or unsecured communications network or combinations thereof. The network 900 may also be part of, or alternatively coupled with a larger trading network, allowing market participants 904, 906 to trade a variety of other products, via the exchange 908. It will be appreciated that the plurality of entities utilizing the disclosed embodiments, e.g. the market participants 904, 906, may be referred to as lenders, borrowers, traders, market makers or by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant 904, 906 and/or the exchange 908.

The exchange 908 provides a system 924 which implements the functions of matching 910 buy/sell or lending/borrowing transactions, clearing 912 those transactions, settling 914 those transactions and managing risk 916 among the market participants 904, 906 and between the market participants and the exchange 908, as well as administration functionality 928 for administering loans between delivery and redemption as will be described. In an alternate embodiment, collateral management 922 and/or request-for-quote functionality (not shown) or netting functionality (not shown) may also be provided, as is discussed in more detail below. The exchange 908 may be include or be coupled with one or more database(s) 920 or other record keeping system which stores data related to open, i.e. un-matched, orders, matched orders which have not yet been delivered, orders, i.e. loans, which have been delivered but not yet redeemed, collateral tendered to secure outstanding loans, or combinations thereof.

Typically, the exchange 908 provides a "clearing house" (not shown) which is a division of the Exchange 908 through which all trades made must be confirmed, matched and settled each day until offset or delivered. The clearing house is an adjunct to the Exchange 908 responsible for settling trading accounts, clearing trades, collecting and maintaining performance bond funds, regulating delivery and reporting trading data. Essentially mitigating credit. Clearing is the procedure through which the Clearing House becomes buyer to each seller of a futures contract, and seller to each buyer, also referred to as a "novation," and assumes responsibility for protecting buyers and sellers from financial loss by assuring performance on each contract. This is effected through the clearing process, whereby transactions are matched. A clearing member is a firm qualified to clear trades through the Clearing House.

In some embodiments, the Exchange 908 may assume an additional role as the central counterparty, e.g., in GRF or SRF transactions, i.e., the Exchange 908 will become the borrower to each lender and lender to each borrower, and assume responsibility for protecting borrowers and lenders from financial loss by assuring performance on each contract, as is done in futures transactions. Additionally, the Exchange 908 further assumes the role as administrator of the loan between delivery and redemption and facilitator of redemption upon expiration of the loan, as will be described. In an alternative embodiment, the Exchange 908 also assumes the roles as manager of the collateral provided by the borrower to secure the loan. As used herein, the term "Exchange" 908 will refer to the centralized clearing and settlement mechanisms, risk management systems, etc., as described below, used for futures trading. By assuming this intermediary role and employing credit screening and risk management mechanisms, parties previously unwilling to lend and/or borrow, due, for example, to credit risks, may now trade anonymously with mitigated risk.

While the disclosed embodiments will be described in reference to the CME, it will be appreciated that these embodiments are applicable to any Exchange 908, including those which trade in equities and other securities. The CME Clearing House clears, settles and guarantees all matched transactions in CME contracts occurring through its facilities. In addition, the CME Clearing House establishes and monitors financial requirements for clearing members and conveys certain clearing privileges in conjunction with the relevant exchange markets.

As an intermediary, the Exchange 908 bears a certain amount of risk in each transaction that takes place. To that end, risk management mechanisms protect the Exchange via the Clearing House. The Clearing House establishes clearing level performance bonds (margins) for all CME products and establishes minimum performance bond requirements for customers of CME products. A performance bond, also referred to as a margin, corresponds with the funds that must be deposited by a customer with his or her broker, by a broker with a clearing member or by a clearing member with the Clearing House, for the purpose of insuring the broker or Clearing House against loss on open futures or options contracts. This is not a part payment on a purchase. The performance bond helps to ensure the financial integrity of brokers, clearing members and the Exchange as a whole. The Performance Bond to Clearing House refers to the minimum dollar deposit which is required by the Clearing House from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e. a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance. As will be discussed below, additional functionality, in particular, collateral management functionality 922, is provided by the disclosed embodiments to provide risk management for certain types of transactions (e.g., GRF transactions).

The accounts of individual members, clearing firms and non-member customers doing business through CME must be carried and guaranteed to the Clearing House by a clearing member. As mentioned above, in every matched transaction executed through the Exchange's facilities, the Clearing House is substituted as the buyer to the seller and the seller to the buyer, with a clearing member assuming the opposite side of each transaction. In some embodiments, e.g., in matched GRF or SRF transactions executed through the Exchange's facilities, the Clearing House is substituted as the lender to the borrower and the borrower to the lender, with a clearing member assuming the opposite side of each transaction. The Clearing House is an operating division of the Exchange 908, and all rights, obligations and/or liabilities of the Clearing House are rights, obligations and/or liabilities of CME. Clearing members assume full financial and performance responsibility for all transactions executed through them and all positions they carry. The Clearing House, dealing exclusively with clearing members, holds each clearing member accountable for every position it carries regardless of whether the position is being carried for the account of an individual member, for the account of a non-member customer, or for the clearing member's own account. Conversely, as the contraside to every position, the Clearing House is held accountable to the clearing members for the net settlement from all transactions on which it has been substituted as provided in the Rules.

More information about minimizing the risk to the Exchange 908 while similarly minimizing the burden on members, approximating the requisite performance bond or margin requirement as closely as possible to the actual positions of the account at any given time and improving the accuracy and flexibility of the mechanisms which estimate performance bond requirements, may be found in the following U.S. Patent Applications, all of which are incorporated by reference herein, which disclose functionality which may be further used in combination with the disclosed embodiments:

U.S. patent application Ser. No. 11/030,815, "SYSTEM AND METHOD FOR ACTIVITY BASED MARGINING", filed Jan. 7, 2005, now U.S. Pat. No. 7,769,667;

U.S. patent application Ser. No. 11/030,796, "SYSTEM AND METHOD FOR EFFICIENTLY USING COLLATERAL FOR RISK OFFSET", filed Jan. 7, 2005, now U.S. Pat. No. 7,426,487;

U.S. patent application Ser. No. 11/030,833, "SYSTEM AND METHOD FOR ASYMMETRIC OFFSETS IN A RISK MANAGEMENT SYSTEM", filed Jan. 7, 2005, now U.S. Pat. No. 7,509,275;

U.S. patent application Ser. No. 11/030,814, "SYSTEM AND METHOD FOR DISPLAYING A COMBINED TRADING AND RISK MANAGEMENT GUI DISPLAY", filed Jan. 7, 2005, now published as U.S. Pat. Pub. No. 2006/0059065;

U.S. patent application Ser. No. 11/031,182, "SYSTEM AND METHOD FOR FLEXIBLE SPREAD PARTICIPATION", filed Jan. 7, 2005, now U.S. Pat. No. 7,593,877;

U.S. patent application Ser. No. 11/030,869, "SYSTEM AND METHOD FOR HYBRID SPREADING FOR RISK MANAGEMENT", filed Jan. 7, 2005, now U.S. Pat. No. 7,428,508;

U.S. patent application Ser. No. 11/030,849, "SYSTEM AND METHOD OF MARGINING FIXED PAYOFF PRODUCTS", filed Jan. 7, 2005, now U.S. Pat. No. 7,430,539;

U.S. patent application Ser. No. 11/590,540, filed Oct. 31, 2007, entitled SYSTEM AND METHOD FOR CENTRALIZED CLEARING OF OVER THE COUNTER FOREIGN EXCHANGE INSTRUMENTS, now published as U.S. Pat. Pub. No. 2007/0118459;

U.S. patent application Ser. No. 11/452,653, filed Jun. 14, 2006, entitled SYSTEM AND METHOD FOR DIRECTED REQUEST FOR QUOTE, now published as U.S. Pat. No. 2007/0118455;

U.S. patent application Ser. No. 11/452,673, filed Jun. 14, 2006, entitled HYBRID CROSS MARGINING, now U.S. Pat. No. 7,801,810;

U.S. patent application Ser. No. 11/601,489, filed Nov. 17, 2006, entitled DETECTION OF INTRA-FIRM MATCHING AND RESPONSE THERETO, now published as U.S. Pat. Pub. No. 2007/0118460;

U.S. patent application Ser. No. 11/600,984, filed Nov. 17, 2006, entitled MULTIPLE QUOTE RISK MANAGEMENT, now U.S. Pat. No. 7,734,538; and U.S. patent application Ser. No. 11/600,993, filed Nov. 17, 2006, entitled CROSS-CURRENCY IMPLIED SPREADS, now U.S. Pat. No. 7,809,631.

In one or more embodiments, the system 924 provided by the Exchange 608 may include order receiving functionality 926, matching functionality 910 coupled with the order receiving functionality 926, as well as settlement 914, clearing 912, risk management 916 functionality and an account database 920 coupled therewith. Further loan administration 928 and collateral management 922 functionality coupled with the risk management functionality 916 may also be provided.

It will be appreciated that the functionality of the Exchange 908, including the order receiving 926, matching 910, clearing 912, settlement 914 and risk management 916 functionality, as well as the loan administration 928 and collateral management 922 functionality, may be implemented in hardware, software or a combination thereof. In one or more embodiments, the disclosed functionality is implemented entirely in hardware. In particular, the exchange 908 may provide an order receiving processor 926, matching processor 910, clearing processor 912, settlement processor 914, risk processor 916, loan administration processor 928 and/or collateral management processor 922 to implement the disclosed functionality. Further, this functionality may be implemented in logic or computer program code stored in a memory and executable by one or more specialized or general purpose processors which may be directly or indirectly connected, such as via a network. The disclosed account database 920 may include one or more databases or other record keeping systems implemented on one or more storage devices or memories, such as magnetic, optical or electrical based storage devices or memories which are configured to store data representative of transactions processed by the exchange 908, including cash or other assets tendered or otherwise delivered, physically or electronically, to the exchange 908 by the lenders, cash or other assets delivered, physically or electronically, by the exchange 908 to the borrowers, cash or other assets returned, physically or electronically, by the exchange 908 to the lenders, collateral delivered, physically or electronically, to the exchange 908 by the borrowers, collateral returned, physically or electronically, by the exchange 908 to the borrowers, changes in value of collateral held by the exchange 908, fees/interest charges or combinations thereof.

In one or more embodiments, a computer implemented method for determining a margin requirement for a market participant includes maintaining, by a processor associated with an exchange, an exchange account reflecting an exchange position resulting from a trade executed on the exchange for a product available via the exchange, the exchange account being maintained separately from a custodian bank account associated with a custodian bank, the custodian bank account reflecting a repo position resulting from a repo transaction facilitated by the custodian bank between the market participant and a counterparty to the repo transaction. The method further includes receiving data reflective of the repo position via a communication interface between the exchange account and the custodian bank account, and determining the margin requirement for the market participant based on the received data and the exchange position.

In one or more embodiments, the method further includes establishing a relationship between the exchange and the custodian bank. The relationship may include a contractual relationship between the exchange and the custodian bank to recognize offsets between the exchange and the custodian bank accounts. Alternatively or additionally, the relationship specifies a margin offset ratio between the product and a collateral type for the repo position. Determining the margin requirement may be further based on the margin offset ratio.

In one or more embodiments, the custodian bank comprises a tri party repo agent. Alternatively or additionally, the repo transaction includes a tri party repo transaction. The repo transaction may include a loan from the counterparty to the market participant such that the repo position reflects collateral provided by the market participant. The repo transaction may include a cash loan from the counterparty to the market participant to facilitate a purchase of an asset held by the custodian bank as collateral. The asset may include a security asset. The product may include a derivative asset of the security asset. The exchange position and the repo position may be characterized by one or more other marginable correlation.

In one or more embodiments, the computer implemented method further includes detecting a default by the market participant, and coordinating liquidation of the exchange position and the repo position upon detecting the default. The method may further include allocating a gain resulting from the coordinated liquidation among the exchange, the custodian bank, and the counterparty. Alternatively or additionally, the computer implemented method may further include allocating a loss resulting from the coordinated liquidation among the exchange, the custodian bank, and the counterparty.

In one or more embodiments, the exchange position is an intra-exchange account net position. Alternatively or additionally, the exchange position is an inter-exchange account net position.

In one or more embodiments, a system for determining a margin requirement for a market participant includes an exchange account stored in a first database for the market participant, the exchange account reflecting a position resulting from a trade executed on an exchange for a product available via the exchange, the exchange account being maintained separately from a custodian bank account in a second database for the market participant, the custodian bank account reflecting a repo position resulting from a repo transaction facilitated by the custodian bank between the market participant and a counterparty to the repo transaction. The system further includes a communication interface processor configured to receive data from the second database reflective of the repo position, and a margin requirement processor coupled with the communication interface processor and the first database and operative to determine the margin requirement for the market participant based on the data and the exchange position.

In one or more embodiments, the communication interface processor includes a position receiver operative to receive the data reflective of the repo position.

In one or more embodiments, the system further includes a liquidation processor coupled with the exchange and the custodian bank accounts and operative to coordinate liquidation of the exchange position and the repo position upon detection of a default by the market participant. The communication interface processor may be configured to receive further data from the custodian bank reflective of the default by the market participant. Alternatively or additionally, the liquidation processor includes a gain/loss calculator operative to determine a gain and/or a loss resulting from the liquidation and further operative to allocate the gain among the exchange, the custodian bank, and the counterparty.

In one or more embodiments, a system for determining a minimum margin requirement for a market participant includes a processor, a memory coupled with the processor, and first logic stored in the memory and executable by the processor to maintain an exchange account reflecting an exchange position resulting from a trade executed on the exchange for a product available via the exchange, the exchange account being maintained separately from a custodian bank account associated with a custodian bank, the custodian bank account reflecting a repo position resulting from a repo transaction facilitated by the custodian bank between the market participant and a counterparty to the repo transaction. The system further includes second logic, coupled with the first logic, stored in the memory and executable by the processor to receive data reflective of the repo position via a communication interface between the exchange account and the custodian bank account, and third logic, coupled with the first logic and the second logic, stored in the memory and executable by the processor to determine the margin requirement for the market participant based on the received data and the exchange position.

In one or more embodiments, the first logic is configured to establish a relationship between the exchange and the custodian bank.

In one or more embodiments, the third logic is configured to determine the margin requirement in accordance with a margin offset ratio.

In one or more embodiments, the system further includes fourth logic stored in the memory, executable by the processor, and coupled with the first logic and the second logic to coordinate liquidation of the exchange position and the repo position upon detection of a default by the market participant wherein the second logic is configured to receive further data reflective of the default via the communication interface.

In one or more embodiments, the fourth logic is configured to allocate a gain and/or a loss resulting from the liquidation among the exchange, the custodian bank, and the counterparty.

While the disclosed embodiments may be described in reference to the CME, it will be appreciated that these embodiments are applicable to any Exchange, including those which trade in equities and other securities.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It will be appreciated that one or more of the processors, memories, logic and/or components described above may be combined or further sub-divided into discrete components thereof, and that all such implementations, accomplishing the disclosed functionality, are contemplated. Further, operation of the above components/functions may be performed on a periodic or batch basis, such as at the close of trading, and/or in real time continuously throughout the trading day or other window of time. Continuous operation may allow a market participant to monitor their margin requirements with respect to changes in their accounts.

To clarify the use in the pending claims and to hereby provide notice to the public, the phrases "at least one of <A>, <B>, ... and <N>" or "at least one of <A>, <B>, ... <N>, or combinations thereof" are defined by the Applicant in the broadest sense, superseding any other implied definitions herebefore or hereinafter unless expressly asserted by the Applicant to the contrary, to mean one or more elements selected from the group comprising A, B, ... and N, that is to say, any combination of one or more of the elements A, B, ... or N including any one element alone or in combination with one or more of the other elements which may also include, in combination, additional elements not listed.

It is therefore intended that the foregoing detailed description be regarded as illustrative rather than limiting, and that it be understood that it is the following claims, including all equivalents, that are intended to define the spirit and scope of this invention.

We claim:

1. A computer implemented method for determining a margin requirement for a market participant, the computer implemented method comprising:

maintaining, by a processor associated with an exchange, an exchange account reflecting an exchange position resulting from a trade executed on the exchange for a product available via the exchange, the exchange account being maintained separately from a custodian bank account associated with a custodian bank, the custodian bank account reflecting a repo position resulting from a repo transaction facilitated by the custodian bank between the market participant and a counterparty to the repo transaction;

receiving data reflective of the repo position via a communication interface between the exchange account and the custodian bank account; and determining, by the processor, the margin requirement for the market participant based on the received data and the exchange position in accordance with a margin offset ratio representative of a degree of correlation between the product and a type of collateral for the repo position, the margin offset ratio being applied to either a notional value of the exchange position or a market value of the collateral to determine a margin offset credit for the margin requirement;

wherein determining the margin requirement comprises:

if the market value of the collateral exceeds the notional value of the exchange position, applying, by the processor, the margin offset ratio to the notional value of the exchange position to determine the margin offset credit; and if the notional value of the exchange position exceeds the market value of the collateral, applying, by the processor, the margin offset ratio to the market value of the collateral to determine the margin offset credit.

2. The computer implemented method of claim 1, further comprising establishing a relationship between the exchange and the custodian bank.

3. The computer implemented method of claim 2 wherein the relationship comprises a contractual relationship between the exchange and the custodian bank to recognize offsets between the exchange and the custodian bank accounts.

4. The computer implemented method of claim 2 wherein the relationship specifies the margin offset ratio.

5. The computer implemented method of claim 1 wherein the custodian bank comprises a tri party repo agent.

6. The computer implemented method of claim 1 wherein the repo transaction comprises a tri party repo transaction.

7. The computer implemented method of claim 1 wherein the repo transaction comprises a loan from the counterparty to the market participant such that the repo position reflects collateral provided by the market participant.

8. The computer implemented method of claim 1 wherein the repo transaction comprises a cash loan from the counterparty to the market participant to facilitate a purchase of an asset held by the custodian bank as collateral.

9. The computer implemented method of claim 8 wherein the asset comprises a security asset and wherein the product comprises a derivative asset of the security asset.

10. The computer implemented method of claim 1, further comprising:

detecting a default by the market participant; and coordinating liquidation of the exchange position and the repo position upon detecting the default.

11. The computer implemented method of claim 10, further comprising allocating a gain resulting from the coordinated liquidation among the exchange, the custodian bank, and the counterparty.

12. The computer implemented method of claim 10, further comprising allocating a loss resulting from the coordinated liquidation among the exchange, the custodian bank, and the counterparty.

13. The computer implemented method of claim 1 wherein the exchange position is an intra-exchange account net position.

14. The computer implemented method of claim 1 wherein the exchange position is an inter-exchange account net position.

15. The computer implemented method of claim 1, wherein the margin offset ratio is representative of whether the product and the collateral have a same term to maturity.

16. A system for determining a margin requirement for a market participant, the system comprising:

an exchange account stored in a first database for the market participant, the exchange account reflecting a position resulting from a trade executed on an exchange for a product available via the exchange, the exchange account being maintained separately from a custodian bank account in a second database for the market participant, the custodian bank account reflecting a repo position resulting from a repo transaction facilitated by the custodian bank between the market participant and a counterparty to the repo transaction;

a communication interface processor configured to receive data from the second database reflective of the repo position;

a margin requirement processor coupled with the communication interface processor and the first database and operative to determine the margin requirement for the market participant based on the data and the exchange position in accordance with a margin offset ratio representative of a degree of correlation between the product and a type of collateral for the repo position, the margin offset ratio being applied to either a notional value of the exchange position or a market value of the collateral to determine a margin offset credit for the margin requirement;

wherein the margin requirement processor is further operative to:

apply the margin offset ratio to the notional value of the exchange position to determine the margin offset credit if the market value of the collateral exceeds the notional value of the exchange position; and apply the margin offset ratio to the market value of the collateral to determine the margin offset credit if the notional value of the exchange position exceeds the market value of the collateral.

17. The system of claim 16, wherein the exchange account is coupled with the custodian bank account via a contractual relationship between the exchange and the custodian bank to recognize offsets between the exchange and the custodian bank accounts.

18. The system of claim 17, wherein the relationship specifies the margin offset ratio.

19. The system of claim 16, wherein the custodian bank comprises a tri party repo agent.

20. The system of claim 16 wherein the repo transaction comprises a tri party repo transaction.

21. The system of claim 16 wherein the communication interface processor comprises a position receiver operative to receive the data reflective of the repo position.

22. The system of claim 16 wherein the repo transaction comprises a loan from the counterparty to the market participant such that the repo position reflects collateral provided by the market participant.

23. The system of claim 16 wherein the repo transaction comprises a cash loan from the counterparty to the market participant to facilitate a purchase of an asset held by the custodian bank as collateral.

24. The system of claim 16 wherein the asset comprises a security asset and wherein the product comprises a derivative asset of the security asset.

25. The system of claim 16, further comprising a liquidation processor coupled with the exchange and the custodian bank accounts and operative to coordinate liquidation of the exchange position and the repo position upon detection of a default by the market participant, wherein the communication interface processor is configured to receive further data from the custodian bank reflective of the default by the market participant.

26. The system of claim 25 wherein the liquidation processor comprises a gain/loss calculator operative to determine a gain resulting from the liquidation and further operative to allocate the gain among the exchange, the custodian bank, and the counterparty.

27. The system of claim 25 wherein the liquidation processor comprises a gain/loss calculator operative to determine a loss resulting from the liquidation and further operative to allocate the loss among the exchange, the custodian bank, and the counterparty.

28. The computer implemented method of claim 16, wherein the margin offset ratio is representative of whether the product and the collateral have a same term to maturity.

29. A system for determining a margin requirement for a market participant, the system comprising:
   means for maintaining an exchange account reflecting an exchange position resulting from a trade executed on the exchange for a product available via the exchange, the exchange account being maintained separately from a custodian bank account associated with a custodian bank, the custodian bank account reflecting a repo position resulting from a repo transaction facilitated by the custodian bank between the market participant and a counterparty to the repo transaction;
   means for receiving data reflective of the repo position via a communication interface between the exchange account and the custodian bank account; and
   means for determining the margin requirement for the market participant based on the received data and the exchange position in accordance with a margin offset ratio representative of a degree of correlation between the product and a type of collateral for the repo position, the margin offset ratio being applied to either a notional value of the exchange position or a market value of the collateral to determine a margin offset credit for the margin requirement;
   wherein means for determining the margin requirement comprises:
   means for applying the margin offset ratio to the notional value of the exchange position to determine the margin offset credit if the market value of the collateral exceeds the notional value of the exchange position; and
   means for applying the margin offset ratio to the market value of the collateral to determine the margin offset credit if the notional value of the exchange position exceeds the market value of the collateral.

30. A system for determining a margin requirement for a market participant, the system comprising:
   a processor;
   a memory coupled with the processor;
   first logic stored in the memory and executable by the processor to maintain an exchange account reflecting an exchange position resulting from a trade executed on the exchange for a product available via the exchange, the exchange account being maintained separately from a custodian bank account associated with a custodian bank, the custodian bank account reflecting a repo position resulting from a repo transaction facilitated by the custodian bank between the market participant and a counterparty to the repo transaction;
   second logic, coupled with the first logic, stored in the memory and executable by the processor to receive data reflective of the repo position via a communication interface between the exchange account and the custodian bank account; and
   third logic, coupled with the first logic and the second logic, stored in the memory and executable by the processor to determine the margin requirement for the market participant based on the received data and the exchange position in accordance with a margin offset ratio representative of a degree of correlation between the product and a type of collateral for the repo position, the margin offset ratio being applied to either a notional value of the exchange position or a market value of the collateral to determine a margin offset credit for the margin requirement;
   wherein the third logic is further executable by the processor to:
   apply the margin offset ratio to the notional value of the exchange position to determine the margin offset credit if the market value of the collateral exceeds the notional value of the exchange position; and
   apply the margin offset ratio to the market value of the collateral to determine the margin offset credit if the notional value of the exchange position exceeds the market value of the collateral.

31. The system of claim 30 wherein the first logic is configured to establish a relationship between the exchange and the custodian bank.

32. The system of claim 31 wherein the relationship comprises a contractual relationship between the exchange and the custodian bank to recognize offsets between the exchange and the custodian bank accounts.

33. The system of claim 31 wherein the relationship specifies the margin offset ratio.

34. The system of claim 30 wherein the custodian bank comprises a tri party repo agent.

35. The system of claim 30 wherein the repo transaction comprises a tri party repo transaction.

36. The system of claim 30 wherein the repo transaction comprises a loan from the counterparty to the market participant such that the repo position reflects collateral provided by the market participant.

37. The system of claim 30 wherein the repo transaction comprises a cash loan from the counterparty to the market participant to facilitate a purchase of an asset held by the custodian bank as collateral.

38. The system of claim 30 wherein the asset comprises a security asset and wherein the product comprises a derivative asset of the security asset.

39. The system of claim 30, further comprising fourth logic stored in the memory, executable by the processor, and coupled with the first logic and the second logic to coordinate liquidation of the exchange position and the repo position upon detection of a default by the market participant wherein the second logic is configured to receive further data reflective of the default via the communication interface.

40. The system of claim 39 wherein the fourth logic is configured to allocate a gain resulting from the liquidation among the exchange, the custodian bank, and the counterparty.

41. The system of claim 30 wherein the fourth logic is configured to allocate a loss resulting from the liquidation among the exchange, the custodian bank, and the counterparty.

42. The computer implemented method of claim 30, wherein the margin offset ratio is representative of whether the product and the collateral have a same term to maturity.

* * * * *